US012119543B2

(12) United States Patent
Choi et al.

(10) Patent No.: US 12,119,543 B2
(45) Date of Patent: Oct. 15, 2024

(54) ANTENNA AND ELECTRONIC DEVICE COMPRISING THE SAME

(71) Applicant: SAMSUNG ELECTRONICS CO., LTD., Suwon-si (KR)

(72) Inventors: Taihwan Choi, Suwon-si (KR); Junho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 269 days.

(21) Appl. No.: 17/541,534

(22) Filed: Dec. 3, 2021

(65) Prior Publication Data

US 2022/0094040 A1 Mar. 24, 2022

Related U.S. Application Data

(63) Continuation of application No. PCT/KR2021/005709, filed on May 7, 2021.

(30) Foreign Application Priority Data

Jun. 23, 2020 (KR) ........................ 10-2020-0076676

(51) Int. Cl.
*H01Q 1/24* (2006.01)
*H01Q 1/38* (2006.01)
*H01Q 21/08* (2006.01)

(52) U.S. Cl.
CPC ............... *H01Q 1/243* (2013.01); *H01Q 1/38* (2013.01)

(58) Field of Classification Search
CPC ........ H01Q 1/243; H01Q 1/50; H01Q 9/0407; H01Q 1/48; H01Q 1/38
See application file for complete search history.

(56) References Cited

U.S. PATENT DOCUMENTS

2004/0004571 A1* 1/2004 Adachi ................ H01Q 9/0428 343/702
2009/0278759 A1 11/2009 Moon et al.
(Continued)

FOREIGN PATENT DOCUMENTS

CN 101697380 4/2010
JP 2016-127474 7/2016
(Continued)

OTHER PUBLICATIONS

International Search Report for PCT/KR2021/005709 dated Aug. 24, 2021, 3 pages.
(Continued)

*Primary Examiner* — Wei (Victor) Y Chan
(74) *Attorney, Agent, or Firm* — Nixon & Vanderhye P.C.

(57) ABSTRACT

According to various embodiments of the disclosure, an electronic device may comprise: a housing forming at least a portion of an exterior of the electronic device, a printed circuit board disposed in an inner space of the housing, and an antenna structure including at least one antenna positioned in the inner space and electrically connected with the printed circuit board. The antenna structure may include a conductive plate having an opening, the opening including a first opening and a second opening extending from the first opening toward an edge of the conductive plate, a first conductive strip at least partially disposed in the second opening to form a first feed, and a second conductive strip forming a second feed different from the first feed. The electronic device may further comprise a wireless communication circuit electrically connected with the first conductive strip and/or the second conductive strip and configured to transmit and/or receive an RF signal having a frequency in a range of about 3 GHz to 300 GHz.

9 Claims, 23 Drawing Sheets

(56) References Cited

U.S. PATENT DOCUMENTS

| | | | | |
|---|---|---|---|---|
| 2014/0043189 | A1* | 2/2014 | Lee | H01Q 9/0485 342/368 |
| 2016/0197404 | A1 | 7/2016 | Hashimoto et al. | |
| 2019/0207305 | A1* | 7/2019 | Hashimoto | H01Q 9/0457 |
| 2020/0052376 | A1* | 2/2020 | Zhu | H01Q 3/38 |
| 2020/0169007 | A1 | 5/2020 | Song et al. | |

FOREIGN PATENT DOCUMENTS

| | | |
|---|---|---|
| KR | 10-2003-0065893 | 8/2003 |
| KR | 10-2008-0023605 | 3/2008 |
| KR | 10-2010-0033888 | 3/2010 |
| KR | 10-2014-0021380 | 2/2014 |
| KR | 10-2020-0061935 | 6/2020 |

OTHER PUBLICATIONS

Written Opinion of the ISA for PCT/KR2021/005709 dated Aug. 24, 2021, 5 pages.
Korean Office Action dated May 16, 2024 for KR Application No. 10-2020-0076676.

* cited by examiner

ANTENNA AND ELECTRONIC DEVICE COMPRISING THE SAME

CROSS-REFERENCE TO RELATED APPLICATIONS

This application is a continuation of International Application No. PCT/KR2021/005709 designating the United States, filed on May 7, 2021, in the Korean Intellectual Property Receiving Office and claiming priority to Korean Patent Application No. 10-2020-0076676, filed on Jun. 23, 2020, in the Korean Intellectual Property Office, the disclosures of which are incorporated by reference herein in their entireties.

BACKGROUND

Field

The disclosure relates to an electronic device, e.g., an antenna and an electronic device including the same.

Description of Related Art

Electronic devices may output stored information as voice or images. As electronic devices are highly integrated, and high-speed, high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling and e-wallet function.

In communication devices included in electronic devices, in order to meet demand for soaring wireless data traffic since the 4G communication system came onto the market, there are ongoing efforts to develop next-generation communication systems, e.g., 5G communication systems or pre-5G communication systems.

For higher data rates, next-generation communication systems adopt high frequency bands of a few tens of GHz, e.g., 6 GHz or more and 300 GHz or less, such as those of mmWave. To mitigate path loss on the high frequency band and increase the reach of radio waves, the following techniques are taken into account for the next-generation communication system: beamforming, massive multi-input multi-output (MIMO), full dimensional MIMO array antenna, analog beamforming, and large scale antenna.

Antenna structures used for next-generation telecommunication (e.g., communication using mmWave) may be influenced by the ambient environment due to their high-frequency characteristics. For example, next-generation communication antennas, despite having the same structure, may exhibit different performances depending on the actual installation environment.

As a structure for implementing a dual band antenna, a multi-mode antenna, which has different lengths depending on modes by applying a diode switch or a multi-band antenna which uses multiple slots having different resonant frequencies and one feeder may be used. As another example, there may be used a multi-band antenna that uses a difference between the lengths from the feeder to the respective ends of arms cut in some areas of a slot antenna. As another example, as a structure for implementing a dual-polarization antenna, an antenna using two feeders having X-pol (cross-polarization) may be used.

In the antenna structures, at least two antennas are used for a dual-band antenna and a dual-polarization antenna structure and may thus occupy a large space when disposed in an electronic device.

SUMMARY

Embodiments of the disclosure provide an electronic device including an antenna capable of implementing a dual-band and a dual-polarization antenna using one opening.

According to various example embodiments of the disclosure, an electronic device may comprise: a housing forming at least a portion of an exterior of the electronic device, a printed circuit board disposed in an inner space of the housing, and an antenna structure including at least one antenna positioned in the inner space and electrically connected with the printed circuit board. The antenna structure may include: a conductive plate having an opening, the opening including a first opening and a second opening extending from the first opening toward an edge of the conductive plate, and formed to surround at least a portion of the opening, a first conductive strip at least partially disposed inside the second opening to form a first feed, and a second conductive strip forming a second feed different from the first feed. The electronic device may further comprise a wireless communication circuit electrically connected with the first conductive strip and/or the second conductive strip and configured to transmit and/or receive a radio frequency (RF) signal having a frequency in a range of about 3 GHz to 300 GHz.

According to various example embodiments of the disclosure, an antenna module may comprise: a first layer including a first opening and a second opening extending from the first opening in a first length direction and formed of a conductive plate, a second layer disposed in parallel along the first length direction of the second opening, positioned to at least partially extend to or face an inside of the first opening, and including a first conductive strip forming a first feed, a third layer at least partially extending along a second length direction different from the first length direction and including a second conductive strip forming a second feed, and a wireless communication circuit electrically connected with the first conductive strip and/or the second conductive strip and configured to transmit and/or receive a radio frequency (RF) signal.

According to various example embodiments of the disclosure, an electronic device including a dual-band and a dual-polarization antenna may be provided.

According to various example embodiments of the disclosure, an electronic device may provide an antenna capable of supporting multiple input/output (MIMO) or diversity in both 28 GHz/39 GHz for an antenna in a high frequency band, such as millimeter wave (mmWave).

According to various example embodiments of the disclosure, an electronic device may enhance the degree of freedom of arrangement of electronic device components by providing an antenna that may efficiently utilize an arrangement space.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
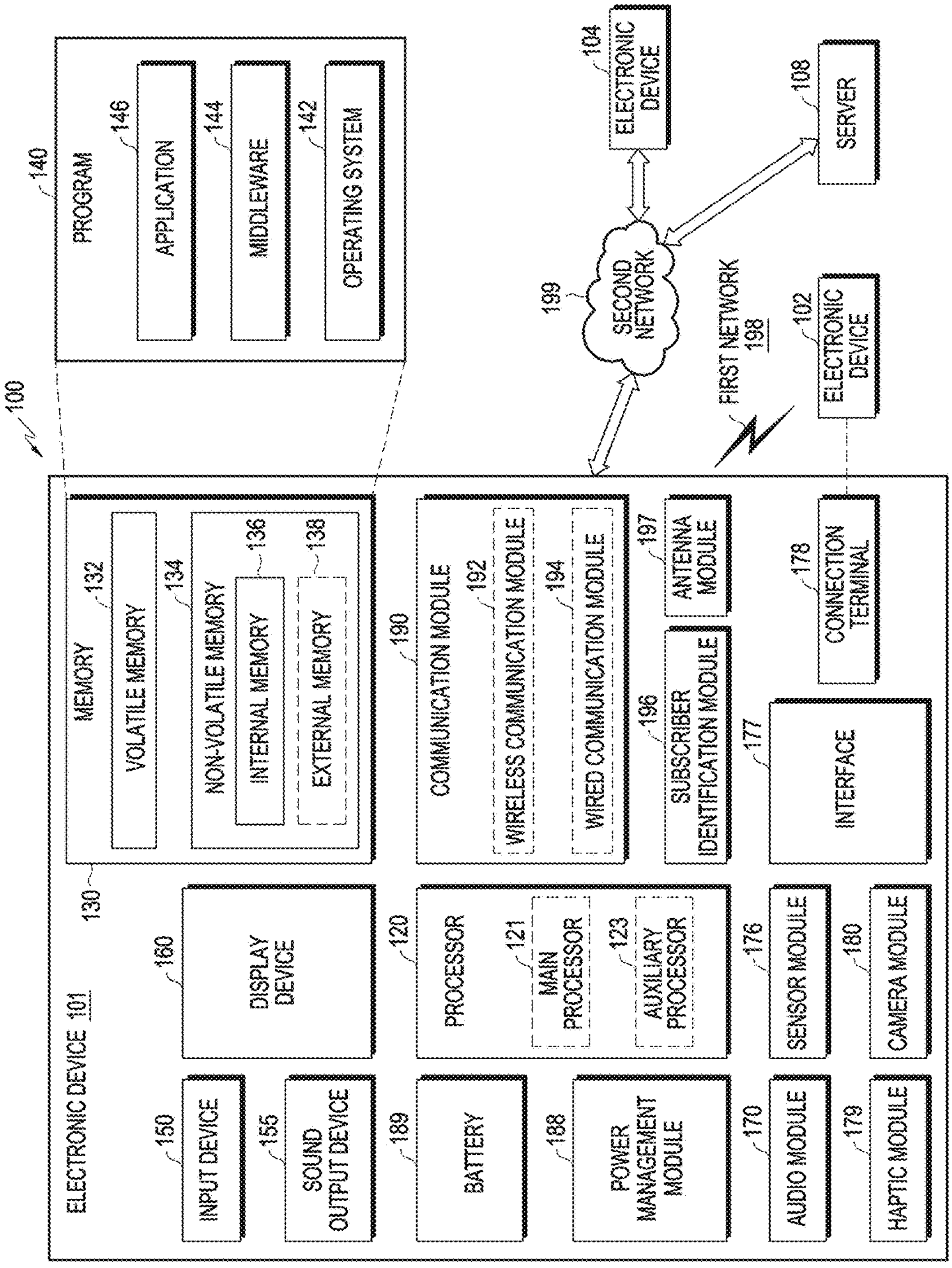
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
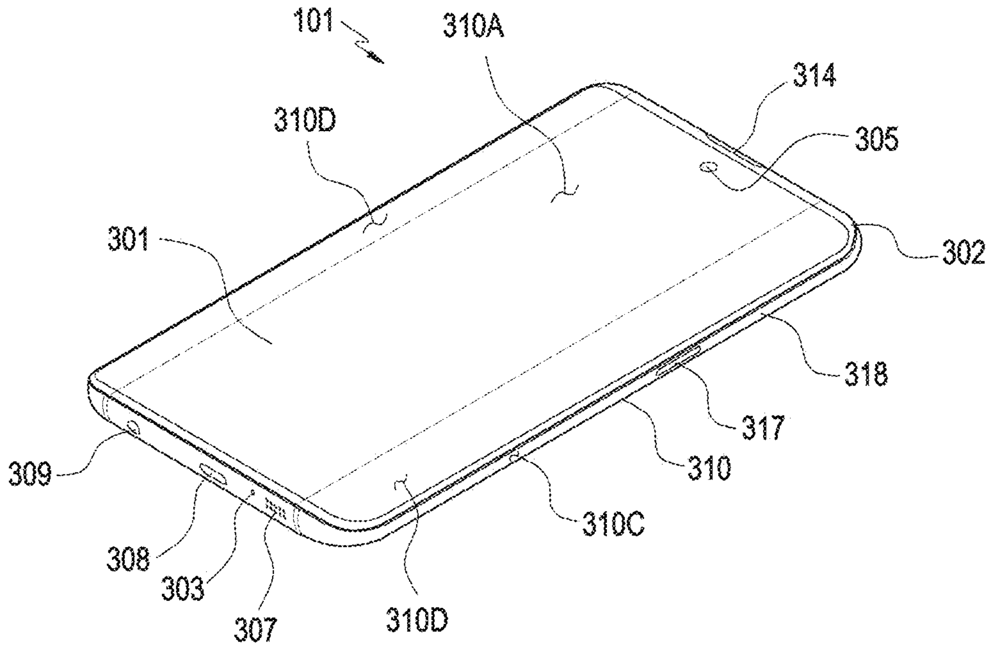
FIG. 2 is a front perspective view illustrating an electronic device according to various embodiments.
Figure 3:
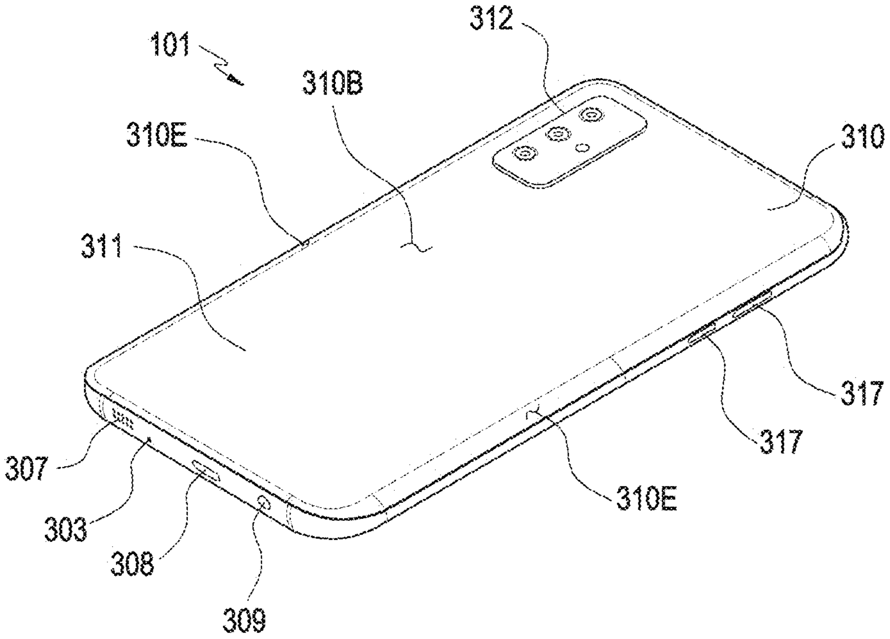
FIG. 3 is a rear perspective view illustrating an electronic device according to various embodiments.

FIG. 2 is a front perspective view illustrating an electronic device according to various embodiments. FIG. 3 is a rear perspective view illustrating an electronic device according to various embodiments.

Referring to FIGS. 2 and 3, according to an embodiment, an electronic device 101 may include a housing 310 with a first (or front) surface 310A, a second (or rear) surface 310B, and a side surface 310C surrounding a space between the first surface 310A and the second surface 310B. According to an embodiment (not shown), the housing may denote a structure forming part of the first surface 310A, the second surface 310B, and the side surface 310C of FIG. 2. According to an embodiment, at least part of the first surface 310A may have a substantially transparent front plate 302 (e.g., a glass plate or polymer plate). The second surface 310B may be formed by a rear plate 311 that is substantially opaque. The rear plate 311 may be formed of, e.g., laminated or colored glass, ceramic, polymer, metal (e.g., aluminum, stainless steel (STS), or magnesium), or a combination of at least two thereof. The side surface 310C may be formed by a side bezel structure (or a "side surface member") 318 that couples to the front plate 302 and the rear plate 311 and includes a metal and/or polymer. According to an embodiment, the rear plate 311 and the side bezel plate 318 may be integrally formed together and include the same material (e.g., a metal, such as aluminum).

In the embodiment illustrated, the front plate 302 may include two first areas 310D, which seamlessly and bendingly extend from the first surface 310A to the rear plate 311, on both the long edges of the front plate 302. In the embodiment (refer to FIG. 3) illustrated, the rear plate 311 may include two second areas 310E, which seamlessly and bendingly extend from the second surface 310B to the front plate, on both the long edges. According to an embodiment, the front plate 302 (or the rear plate 311) may include only one of the first areas 310 (or the second areas 310E). In an embodiment, the first areas 310D or the second areas 301E may partially be excluded. According to the embodiments, at side view of the electronic device 101, the side bezel structure 318 may have a first thickness (or width) for sides that do not have the first areas 310D or the second areas 310E and a second thickness, which is smaller than the first thickness, for sides that have the first areas 310D or the second areas 310E.

According to an embodiment, the electronic device 101 may include at least one of a display 301, audio modules 303, 307, and 314 (e.g., the audio module 170 of FIG. 1), a sensor module (e.g., the sensor module of FIG. 1). 176), camera modules 305 and 312 (e.g., the camera module 180 of FIG. 1), a key input device 317 (e.g., the input device 150 of FIG. 1), and connector holes 308 and 309. According to an embodiment, the electronic device 101 may exclude at least one (e.g., the key input device 317 or the connector hole 309) of the components or may add other components.

According to an embodiment, the display 301 may be visible of viewable through, e.g., a majority portion of the front plate 302. According to an embodiment, at least a portion of the display 301 may be visible or viewable through the front plate 302 forming the first surface 310A and the first areas 310D of the side surface 310C. According to an embodiment, the edge of the display 301 may be formed to be substantially the same in shape as an adjacent outer edge of the front plate 302. According to an embodiment (not shown), the interval between the outer edge of the display 301 and the outer edge of the front plate 302 may remain substantially even to give a larger area of exposure the display 301.

According to an embodiment, the surface (or the front plate 302) of the housing 310 may include a screen display area formed as the display 301 is visible or viewable. For example, the screen display area may include the first surface 310A and/or the first areas 310D of the side surface 310C.

In an embodiment (not shown), a recess or opening may be formed in a portion of the screen display area (e.g., the first surface 310A, and/or the first areas 310D) of the display 301 and there may be included at least one or more of an audio module 314, a sensor module, a camera module 305, and a light emitting device aligned with the recess or opening. In an embodiment (not shown), at least one or more of the audio module 314, the sensor module, and the camera module 305 may be included on the rear surface of the screen display area of the display 301. According to an embodiment (not shown), the display 301 may be disposed to be coupled with, or adjacent, a touch detecting circuit, a pressure sensor capable of measuring the strength (pressure) of touches, and/or a digitizer for detecting a magnetic field-type stylus pen. According to an embodiment, at least part of the sensor module and/or at least part of the key input device 317 may be disposed in the first areas 310D and/or the second areas 310E.

According to an embodiment, the audio modules 303, 307, and 314 may include, e.g., a microphone hole 303 and speaker holes 307 and 314. The microphone hole 303 may have a microphone inside to obtain external sounds. According to an embodiment, there may be a plurality of microphones to be able to detect the direction of a sound. The speaker holes 307 and 314 may include an external speaker hole 307 and a phone receiver hole 314. According to an embodiment, the speaker holes 307 and 314 and the microphone hole 303 may be implemented as a single hole, or speakers may be rested without the speaker holes 307 and 314 (e.g., piezo speakers). The audio modules 303, 307, and 314 are not limited to the above-described structure. Depending on the structure of the electronic device 101, various design changes may be made—e.g., only some of the audio modules may be mounted, or a new audio module may be added.

According to an embodiment, the sensor modules (not shown) may generate an electrical signal or data value corresponding to an internal operating state or external environmental state of the electronic device 101. The sensor modules may include a first sensor module (not shown) (e.g., a proximity sensor) and/or a second sensor module (not shown) (e.g., a fingerprint sensor) disposed on the first surface 310A of the housing 310 and/or a third sensor module (not shown) (e.g., a heart-rate monitor (HRM) sensor) and/or a fourth sensor module (not shown) (e.g., a fingerprint sensor) disposed on the second surface 310B of the housing 310. The fingerprint sensor may be disposed on the second surface 310A as well as on the first surface 310B (e.g., the display 301) of the housing 310. The electronic device 101 may include a sensor module not shown, e.g., at least one of a gesture sensor, a gyro sensor, a barometric sensor, a magnetic sensor, an acceleration sensor, a grip sensor, a color sensor, an infrared (IR) sensor, a biometric sensor, a temperature sensor, a humidity sensor, or an illuminance sensor. The sensor modules are not limited to the above-described structure. Depending on the structure of the electronic device 101, various design changes may be made—e.g., only some of the sensor modules may be mounted, or a new sensor module may be added.

According to an embodiment, the camera modules 305 and 312 may include a first camera device 305 disposed on the first surface 310A of the electronic device 101, and a second camera device 312 and/or a flash 313 disposed on the second surface 310B. The camera modules 305 and 312 may include one or more lenses, an image sensor, and/or an image signal processor. The flash 313 may include, e.g., a light emitting diode (LED) or a xenon lamp. According to an embodiment, two or more lenses (an infrared (IR) camera, a wide-angle lens, and a telescopic lens) and image sensors may be disposed on one surface of the electronic device 101. The camera modules 305, 312, and 313 are not limited to the above-described structure. Depending on the structure of the electronic device 101, various design changes may be made—e.g., only some of the camera modules may be mounted, or a new camera module may be added.

According to an embodiment, the electronic device 101 may include a plurality of camera modules (e.g., a dual camera or triple camera) having different attributes (e.g., angle of view) or functions. For example, the camera modules 305 and 312 may include a plurality of lenses having different angles of view, and the electronic device 101 may control to select one of the plurality of lenses of the camera modules 305 and 312 performed on the electronic device 101. At least one of the plurality of camera modules 305 and 312 may form, for example, a wide-angle camera and at least another of the plurality of camera modules may form a telephoto camera. As another example, at least one of the plurality of camera modules 305 and 312 may form, for example, a front camera and at least another of the plurality of camera modules may form a rear camera. As another example, the camera modules 305 and 312 may include at least one of a wide-angle camera, a telephoto camera, and an infrared (IR) camera (e.g., a time of flight (TOF) camera, a structured light camera). According to an embodiment, the IR camera may be operated as at least a portion of the sensor module. For example, the TOF camera may be operated as at least a portion of a sensor module (not shown) for detecting the distance to the subject.

According to an embodiment, the key input device 317 may be disposed, e.g., on the side surface 310C of the housing 310. According to an embodiment, the electronic device 101 may exclude all or some of the above-mentioned key input devices 317 and the excluded key input devices 317 may be implemented in other forms, e.g., as soft keys, on the display 301. According to an embodiment, the key input device may include the sensor module disposed on the second surface 310B of the housing 310.

According to an embodiment, the light emitting device (not shown) may be disposed on, e.g., the first surface 310A of the housing 310. The light emitting device (not shown) may provide, e.g., information about the state of the electronic device 101 in the form of light. According to an embodiment, the light emitting device may provide a light source that interacts with, e.g., the camera module 305. The light emitting device (not shown) may include, e.g., a light emitting device (LED), an infrared (IR) LED, or a xenon lamp.

According to an embodiment, the connector holes 308 and 309 may include, e.g., a first connector hole 308 for receiving a connector (e.g., a universal serial bus (USB) connector) for transmitting or receiving power and/or data to/from an external electronic device and/or a second connector hole (e.g., an earphone jack) 309 for receiving a connector for transmitting or receiving audio signals to/from the external electronic device. The connector holes 308 and 309 are not limited to the above-described structure. Depending on the structure of the electronic device 101, various design changes may be made—e.g., only some of the connector holes may be mounted, or a new connector hole may be added.

According to an embodiment, some 305 of the camera modules 305 and 312 and/or some of the sensor modules may be disposed to be able to sense aspects of the outside through at least a portion of the display 301. For example, the camera module 305 may include a punch hole camera disposed inside a hole or recess formed between the rear surface and the second surface 310B of the display 301. According to an embodiment, the camera module 312 may be disposed inside the housing 310 so that the lens is exposed to the second surface 310B of the electronic device 101. For example, the camera module 312 may be disposed on a printed circuit board (e.g., the printed circuit board 340 of FIG. 4).

According to an embodiment, the camera module 305 and/or the sensor module may be disposed to contact the external environment through a designated area of the display 301 and the front plate 302 from the inner space of the electronic device 101. For example, the designated area may be an area in which pixels are not disposed in the display 301. As another example, the designated area may be an area in which pixels are disposed in the display 301. When viewed from above the display 301, at least a portion of the designated area may overlap the camera module 305. As another example, some sensor modules may be arranged to perform their functions without being visually exposed through the front plate 302 from the inner space of the electronic device.

The electronic device according to various embodiments of the disclosure may be various types of electronic devices. According to the disclosure, although a bar-shaped mobile is disclosed, the disclosure is not limited thereto and may include mobiles having various shapes, such as foldable mobiles and rollable mobiles including a flexible display.

Figure 4:
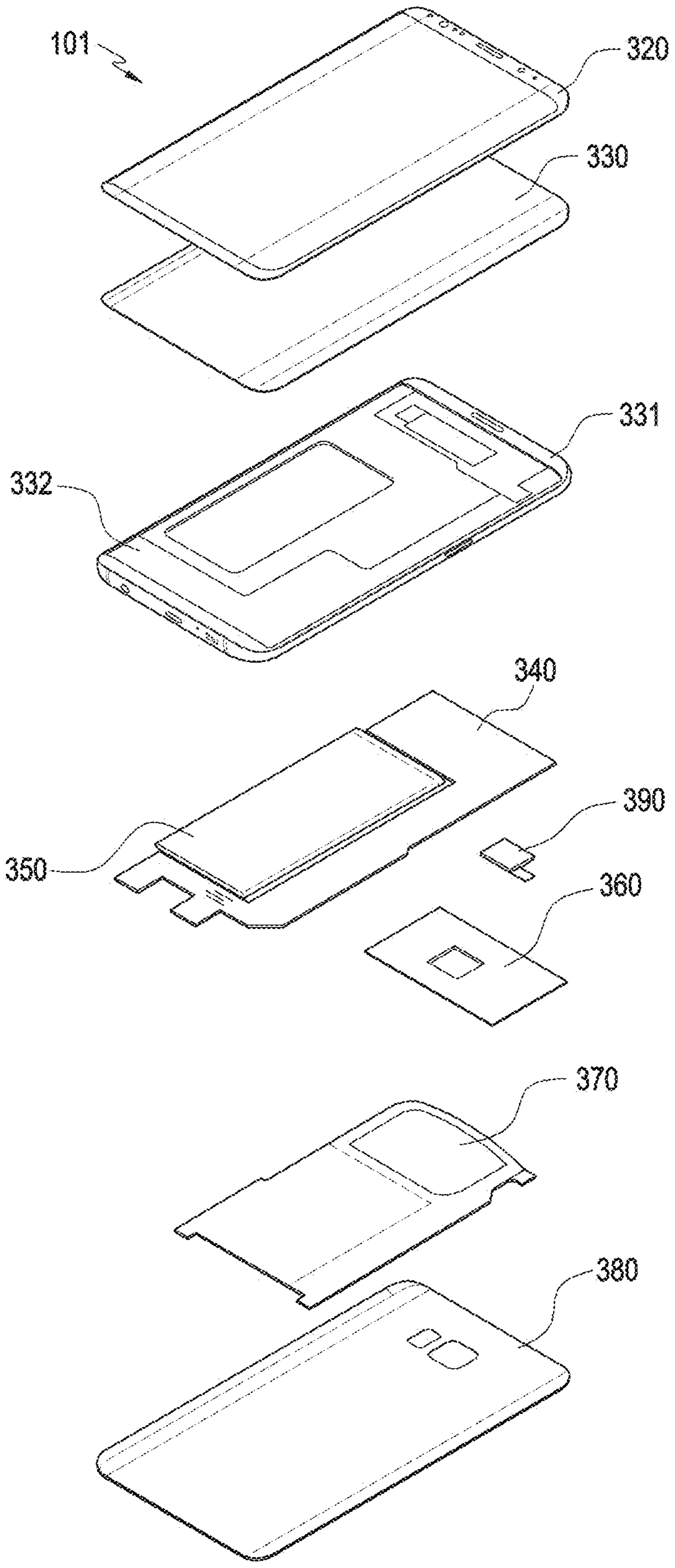
FIG. 4 is an exploded perspective view illustrating an electronic device according to various embodiments.

FIG. 4 is an exploded perspective view illustrating an electronic device according to various embodiments.

Referring to FIG. 4, according to various embodiments, an electronic device 101 (e.g., the electronic device 101 of FIGS. 1 to 3) may include a side bezel structure 331 (e.g., the side bezel structure 318 of FIG. 2), a first supporting member 332, a front plate 320 (e.g., the front plate 302 of FIG. 2), a display 330 (e.g., the display 301 of FIG. 2), a printed circuit board 340 (e.g., a PCB, flexible PCB (FPCB), or rigid flexible PCB (RFPCB)), a battery 350 (e.g., the battery 189 in FIG. 1), a second supporting member 360 (e.g., a rear case), an antenna 370 (e.g., the antenna module 197 of FIG. 1), and/or a rear plate 380 (e.g., the rear plate 311 of FIG. 2). According to an embodiment, the electronic device 101 may exclude at least one (e.g., the first supporting member 332 or second supporting member 360) of the components or may add other components. At least one of the components of the electronic device 101 may be the same or similar to at least one of the components of the electronic device 101 of FIG. 2 or 3 and duplicate description thereof may not be repeated below.

According to various embodiments, the first supporting member 332 may be disposed inside the electronic device 101 to be connected with the side bezel structure 331 or integrated with the side bezel structure 331. The first supporting member 332 may be formed of, e.g., a metal and/or non-metallic material (e.g., polymer). The display 330 may be joined onto one surface of the first supporting member 332, and the printed circuit board 340 may be joined onto the opposite surface of the first supporting member 311.

According to various embodiments, a processor, a memory, and/or an interface may be mounted on the printed circuit board 340. The processor may include one or more of, e.g., a central processing unit, an application processor, a graphic processing device, an image signal processing, a sensor hub processor, or a communication processor. According to various embodiments, the printed circuit board 340 may include a flexible printed circuit board type radio frequency cable (FRC). For example, the printed circuit board 340 may be disposed on at least a portion of the first supporting member 332 and may be electrically connected with an antenna module (e.g., the antenna module 197 of FIG. 1) and a communication module (e.g., the communication module 190 of FIG. 1).

According to an embodiment, the memory may include, e.g., a volatile or non-volatile memory.

According to an embodiment, the interface may include, for example, a high definition multimedia interface (HDMI), a universal serial bus (USB) interface, a secure digital (SD) card interface, and/or an audio interface. The interface may electrically or physically connect, e.g., the electronic device 101 with an external electronic device and may include a USB connector, an SD card/multimedia card (MMC) connector, or an audio connector.

According to an embodiment, the battery 350 may be a device for supplying power to at least one component of the electronic device 101. The battery 189 may include, e.g., a primary cell which is not rechargeable, a secondary cell which is rechargeable, or a fuel cell. At least a portion of the battery 350 may be disposed on substantially the same plane as the printed circuit board 340. The battery 350 may be integrally or detachably disposed inside the electronic device 101.

According to various embodiments, the second supporting member 360 (e.g., a rear case) may be disposed between the printed circuit board 340 and the antenna 370. For example, the second supporting member 360 may include one surface to which at least one of the printed circuit board 340 and the battery 350 is coupled, and another surface to which the antenna 370 is coupled.

According to an embodiment, the antenna 370 may be disposed between the rear plate 380 and the battery 350. The antenna 370 may include, e.g., a near-field communication (NFC) antenna, a wireless charging antenna, and/or a magnetic secure transmission (MST) antenna. The antenna 370 may perform short-range communication with, e.g., an external device or may wirelessly transmit or receive power necessary for charging. According to an embodiment, an antenna structure may be formed by a portion or combination of the side bezel structure 331 and/or the first supporting member 332.

According to various embodiments of the disclosure, the electronic device 101 may include a plurality of antenna modules 390. For example, some of the plurality of antenna modules 390 may be implemented to transmit or receive radio waves with different characteristics (referred to as radio waves of frequency bands A and B) to implement MIMO. As another example, some of the plurality of antenna modules 390 may be configured to simultaneously transmit or receive radio waves with substantially the same characteristic (referred to as radio waves of frequencies A1 and A2 in frequency band A) to implement diversity. As another example, some of the plurality of antenna modules 390 may be configured to simultaneously transmit or receive radio waves with substantially the same characteristic (referred to as radio waves of frequencies B1 and B2 in frequency band B) to implement diversity. According to an embodiment, two antenna modules may be included. Alternatively, the electronic device 101 may include four antenna modules to implement both MIMO and diversity. According to an embodiment, the electronic device 101 may include only one antenna module 390.

According to an embodiment, given the transmission and reception nature of radio waves, when one antenna module is disposed in a first position of the electronic device 101, another antenna module may be disposed in a second position, which is separated from the first position, of the electronic device 101. As another example, one antenna module and another antenna module may be disposed considering the distance therebetween depending on diversity characteristics.

According to an embodiment, at least one antenna module 390 may include a wireless communication circuit to process radio waves transmitted or received in a high frequency band (e.g., 6 GHz or more and 300 GHz or less). According to an embodiment of the present disclosure, the antenna of the at least one antenna module 390 may include, e.g., a slot or aperture-type antenna radiator. Further, a plurality of antennas may be arrayed form an antenna array. According to an embodiment, a chip (e.g., an integrated circuit (IC) chip) in which part of the wireless communication circuit is implemented may be disposed on the opposite surface of the surface where the antenna radiator is disposed or on one side of the area where the antenna radiator is disposed and may be electrically connected via a line which is formed of a printed circuit pattern.

According to various embodiments, the rear plate 380 may form at least a portion of the rear surface (e.g., the second surface 310B of FIG. 3) of the electronic device 101.

Figure 5:
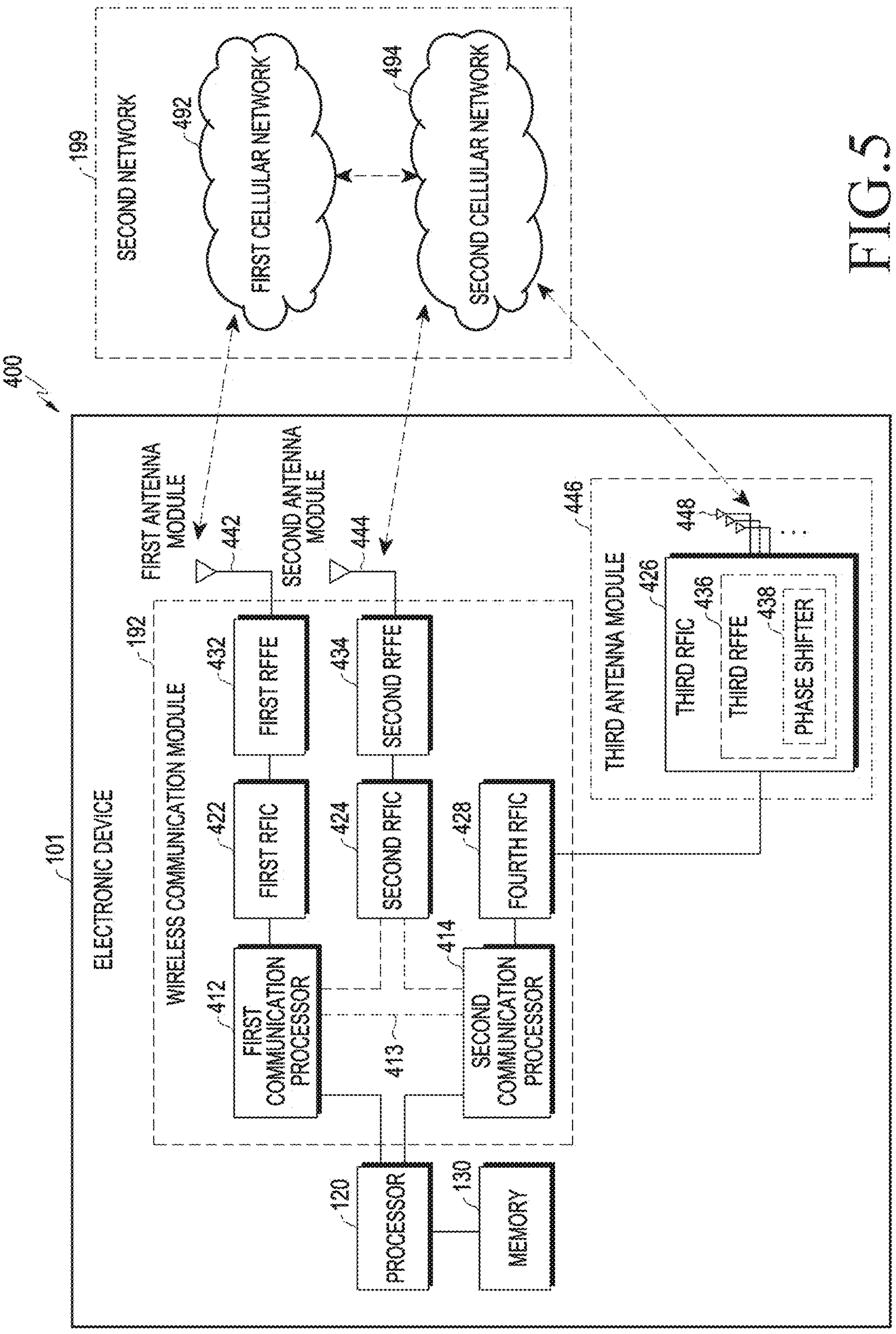
FIG. 5 is a block diagram illustrating an example configuration of an electronic device in a network environment including a plurality of cellular networks according to various embodiments.

FIG. 5 is a block diagram 400 illustrating an example configuration of an electronic device in a network environment including a plurality of cellular networks according to various embodiments.

Referring to FIG. 5, the electronic device 101 may include a first communication processor 412, a second communication processor 414, a first radio frequency integrated circuit (RFIC) 422, a second RFIC 424, a third RFIC 426, a fourth RFIC 428, a first radio frequency front end (RFFE) 432, a second RFFE 434, a first antenna module 442, a second antenna module 444, and an antenna 448. The electronic device 101 may further include a processor 120 and a memory 130. The second network 199 may include a first cellular network 492 and a second cellular network 494. According to an embodiment, the electronic device 101 may further include at least one component among the components of FIG. 2, and the second network 199 may further include at least one other network. According to an embodiment, the first communication processor 412, the second communication processor 414, the first RFIC 422, the second RFIC 424, the fourth RFIC 428, the first RFFE 432, and the second RFFE 434 may form at least part of the wireless communication module 192. According to an embodiment, the fourth RFIC 428 may be omitted or be included as part of the third RFIC 426.

According to an embodiment, the first CP 412 may establish a communication channel of a band that is to be used for wireless communication with the first cellular network 492 or may support legacy network communication via the established communication channel. According to various embodiments, the first cellular network may be a legacy network that includes second generation (2G), third generation (3G), fourth generation (4G), or long-term evolution (LTE) networks. The second communication processor 414 may establish a communication channel corresponding to a designated band (e.g., from about 6 GHz to about 60 GHz) among bands that are to be used for wireless communication with the second cellular network 494 or may support fifth generation (5G) network communication via the established communication channel. According to an embodiment, the second cellular network 494 may be a 5G network defined by the 3rd generation partnership project (3GPP). Additionally, according to an embodiment, the first communication processor 412 or the second communication processor 414 may establish a communication channel corresponding to another designated band (e.g., about 6 GHz or less) among the bands that are to be used for wireless communication with the second cellular network 494 or may support fifth generation (5G) network communication via the established communication channel According to an embodiment, the first communication processor 412 and the second communication processor 414 may be implemented in a single chip or a single package. According to an embodiment, the first communication processor 412 or the second communication processor 414, along with the processor 120, an assistance processor 123, or communication module 190, may be formed in a single chip or single package.

According to an embodiment, the first CP 412 and the second CP 414 may be connected together directly or indirectly by an interface (not shown) to provide or receive data or control signals unilaterally or bi-laterally.

According to an embodiment, upon transmission, the first RFIC 422 may convert a baseband signal generated by the first CP 412 into a radio frequency (RF) signal with a frequency ranging from about 700 MHz to about 3 GHz which is used by the first cellular network 492 (e.g., a legacy network). Upon receipt, the RF signal may be obtained from the first cellular network 492 (e.g., a legacy network) through an antenna (e.g., the first antenna module 442) and be pre-processed via an RFFE (e.g., the first RFFE 432). The first RFIC 422 may convert the pre-processed RF signal into a baseband signal that may be processed by the first communication processor 412.

According to an embodiment, upon transmission, the second RFIC 424 may convert the baseband signal generated by the first communication processor 412 or the second communication processor 414 into a Sub6-band (e.g., about 6 GHz or less) RF signal (hereinafter, "5G Sub6 RF signal") that is used by the second cellular network 494 (e.g., a 5G network). Upon receipt, the 5G Sub6 RF signal may be obtained from the second cellular network 494 (e.g., a 5G network) through an antenna (e.g., the second antenna module 444) and be pre-processed via an RFFE (e.g., the second RFFE 434). The second RFIC 424 may convert the pre-processed 5G Sub6 RF signal into a baseband signal that may be processed by a corresponding processor of the first communication processor 412 and the second communication processor 414.

According to an embodiment, the third RFIC 426 may convert the baseband signal generated by the second communication processor 414 into a 5G Above6 band (e.g., from about 6 GHz to about 60 GHz) RF signal (hereinafter, "5G Above6 RF signal") that is to be used by the second cellular network 494 (e.g., a 5G network). Upon receipt, the 5G Above6 RF signal may be obtained from the second cellular network 494 (e.g., a 5G network) through an antenna (e.g., the antenna 448) and be pre-processed via the third RFFE 436. The third RFIC 426 may convert the pre-processed 5G Above6 RF signal into a baseband signal that may be processed by the second communication processor 414.

According to an embodiment, the third RFFE 436 may be formed as part of the third RFIC 426.

According to an embodiment, the electronic device 101 may include the fourth RFIC 428 separately from, or as at least part of, the third RFIC 426. In this case, the fourth RFIC 428 may convert the baseband signal generated by the second communication processor 414 into an intermediate frequency band (e.g., from about 9 GHz to about 11 GHz) RF signal (hereinafter, "IF signal") and transfer the IF signal to the third RFIC 426. The third RFIC 426 may convert the IF signal into a 5G Above6 RF signal. Upon receipt, the 5G Above6 RF signal may be received from the second cellular network 494 (e.g., a 5G network) through an antenna (e.g., the antenna 448) and be converted into an IF signal by the third RFIC 426. The fourth RFIC 428 may convert the IF signal into a baseband signal that may be processed by the second communication processor 414.

According to an embodiment, the first RFIC 422 and the second RFIC 424 may be implemented as at least part of a single chip or single package. According to an embodiment, the first RFFE 432 and the second RFFE 434 may be implemented as at least part of a single chip or single package. According to an embodiment, at least one of the first antenna module 442 or the second antenna module 444 may be omitted or be combined with another antenna module to process multi-band RF signals.

According to an embodiment, the third RFIC 426 and the antenna 448 may be disposed on the same substrate to form the third antenna module 446. For example, the wireless communication module 192 or the processor 120 may be disposed on a first substrate (e.g., a main painted circuit board (PCB)). In this case, the third RFIC 426 and the antenna 448, respectively, may be disposed on one area (e.g., the bottom) and another (e.g., the top) of a second substrate (e.g., a sub PCB) which is provided separately from the first substrate, forming the third antenna module 446. Placing the third RFIC 426 and the antenna 448 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 494 (e.g., a 5G network).

According to an embodiment, the antenna 448 may be formed as an antenna array which includes a plurality of antenna radiators available for beamforming. In this case, the third RFIC 426 may include a plurality of phase shifters 438 corresponding to the plurality of antenna radiators, as part of the third RFFE 436. Upon transmission, the plurality of phase shifters 438 may change the phase of the 5G Above6 RF signal which is to be transmitted to the outside (e.g., a 5G network base station) of the electronic device 101 via their respective corresponding antenna radiators. Upon receipt, the plurality of phase shifters 438 may change the phase of the 5G Above6 RF signal received from the outside to the same or substantially the same phase via their respective corresponding antenna radiators. This enables transmission or reception via beamforming between the electronic device 101 and the outside.

According to an embodiment, the second cellular network 494 (e.g., a 5G network) may be operated independently (e.g., as standalone (SA)) from, or in connection (e.g., as non-standalone (NSA)) with the first cellular network 492 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 430 and be accessed by other components (e.g., the processor 120, the first communication processor 412, or the second communication processor 414).

Figure 6A:
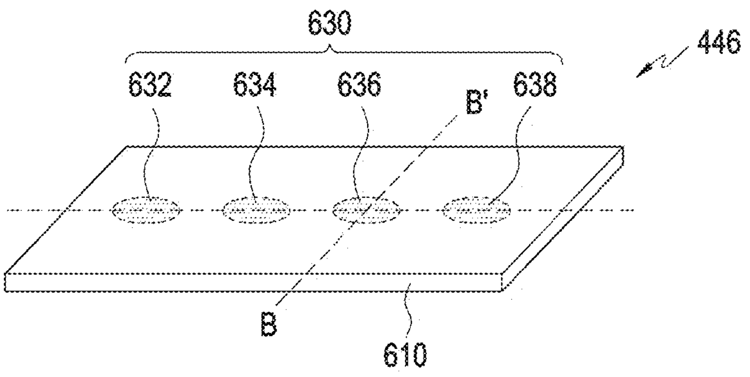
FIGS. 6A, 6B and 6C are diagrams illustrating an example structure of the third antenna module described with reference to FIG. 5, according to various embodiments.
Figure 6B:
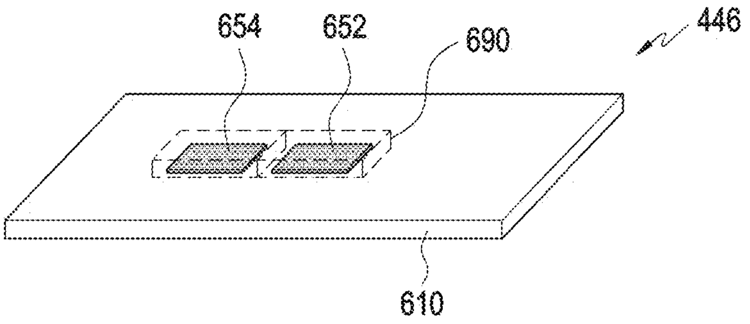
Figure 6C:
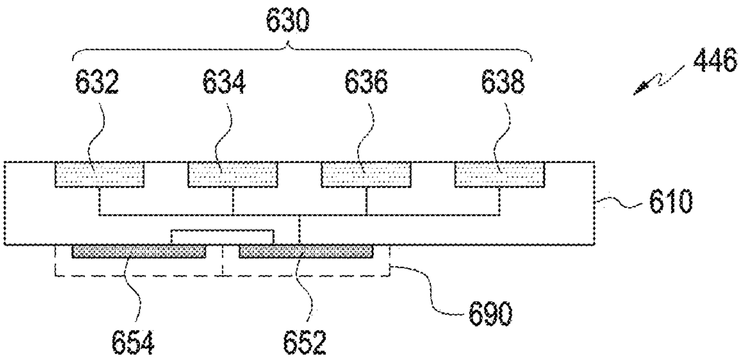

FIGS. 6A, 6B and 6C are diagrams illustrating an example structure of the third antenna module 446 described with reference to FIG. 5, according to various embodiments. FIG. 6A is a perspective view illustrating the third antenna module 446 viewed from one side according to various embodiments. FIG. 6B is a perspective view illustrating the third antenna module 446 viewed from another side according to various embodiments. FIG. 6C is a cross-sectional view of the third antenna module 446, taken along line A-A' according to various embodiments.

Referring to FIGS. 6A, 6B and 6C, according to an embodiment, the third antenna module 446 may include a printed circuit board 610, an antenna array 630, a radio frequency integrated circuit (RFIC) 652, and a power management integrated circuit (PMIC) 654. The third antenna module 446 may optionally further include a shielding member 690. According to an embodiment, at least one of the above-mentioned components may be omitted, or at least two of the components may be integrally formed with each other.

According to an embodiment, the printed circuit board 610 may include a plurality of conductive layers and a plurality of non-conductive layers alternately stacked with the conductive layers. Electronic components arranged on, or outside of, the printed circuit board 610 may be electrically connected together via wires and conductive vias formed on or through the conductive layers.

According to an embodiment, the antenna array 630 (e.g., the antenna 448 of FIG. 5) may include a plurality of antennas 632, 634, 636, or 638 arranged to form directional beams. The plurality of antennas may be formed on a first surface of the printed circuit board 610 as shown. According to an embodiment, the antenna array 630 may be formed inside the printed circuit board 610. According to embodiments, the antenna array 630 may include a plurality of antenna arrays (e.g., a dipole antenna array and/or a patch antenna array) of the same or different shapes or kinds.

According to an embodiment, the RFIC 652 (e.g., the third RFIC 426 of FIG. 5) may be disposed in another area (e.g., a second surface opposite to the first surface) of the printed circuit board 610 which is spaced apart from the antenna array. The RFIC is configured to be able to process signals of a selected frequency band which are transmitted or received via the antenna array 630. According to an embodiment, upon transmission, the RFIC 652 may convert a baseband signal obtained from a communication processor (not shown) into a designated band of RF signal. Upon receipt, the RFIC 652 may convert the RF signal received via the antenna array 652 into a baseband signal and transfer the baseband signal to the communication processor.

According to an embodiment, upon transmission, the RFIC 652 may up-convert an IF signal (e.g., ranging from about 9 GHz to about 15 GHz) obtained from the intermediate frequency integrated circuit (IFIC) into a selected band of RF signal. Upon receipt, the RFIC 652 may down-convert the RF signal obtained via the antenna array 630 into an IF signal and transfer the IF signal to the IFIC.

According to an embodiment, the PMIC 654 may be disposed in another portion (e.g., the second surface) of the PCB 610 which is spaced apart from the antenna array. The PMIC may receive a voltage from the main PCB (not shown) and provide necessary power to various components (e.g., the RFIC 652) on the antenna module.

According to an embodiment, the shielding member 690 may be disposed in a portion (e.g., the second surface) of the PCB 610 to electromagnetically shield off at least one of the RFIC 652 or the PMIC 654. According to an embodiment, the shielding member 690 may include a shield can.

Although not shown, according to various embodiments, the third antenna module 446 may be electrically connected with another printed circuit board (e.g., the main printed circuit board) via the module interface. The module interface may include a connecting member, e.g., a coaxial cable connector, board-to-board connector, interposer, or flexible printed circuit board (FPCB). The RFIC 652 and/or the PMIC 654 may be electrically connected with the printed circuit board via the connecting member.

FIGS. 7A, 7B, 7C and 7D are diagrams illustrating an example structure of an electronic device according to various embodiments.

Referring to FIGS. 7A, 7B, 7C and 7D, an electronic device 101 may include a housing 310 that includes a first plate 520 (e.g., the front plate), a second plate 530 (e.g., the rear plate or rear glass) spaced apart from the first plate 520 and facing in the opposite direction, and a side surface member 540 surrounding a space between the first plate 520 and the second plate 530.

According to an embodiment, the first plate 520 may include a transparent material including a glass plate. The second plate 530 may include a non-conductive and/or conductive material. The side surface member 540 may include a conductive material and/or a non-conductive material. According to an embodiment, at least a portion of the side surface member 540 may be integrally formed with the second plate 530. In an embodiment, the side surface member 540 may include a first insulator to a third insulator 541, 543, and 545, and a first conductor to a third conductor 551, 553, and 555. In another example, the side surface member 540 may omit one of the first insulator to third insulator 541, 543, and 545, and/or the first conductor to the third conductor 551, 553, and 555. For example, if the first to third insulators 541, 543, and 545 are omitted, the portions of the first to third insulators 541, 543, and 545 may be formed of conductors. As another example, if the first to third conductors 551, 553, and 555 are omitted, the portions of the first to third conductors 551, 553, and 555 may be formed of insulators.

According to an embodiment, the electronic device 101 may further include, in the space, a display disposed to be seen through the first plate 520, a main printed circuit board (PCB) 571, and/or a mid-plate (not shown). Optionally, the electronic device 101 may further include other various components.

According to an embodiment, the electronic device 101 may include a first antenna (e.g., the first conductor 551), a second antenna (e.g., the second conductor 553), or a third antenna (e.g., the third conductor 555) in the space and/or in a portion (e.g., the side surface member 540) of the housing 310. For example, the first to third antennas may be used as radiators of antennas supporting, e.g., cellular communication (e.g., second generation (2G), 3G, 4G, or LTE), short-range communication (e.g., Wi-Fi, Bluetooth, or NFC), and/or global navigation satellite system (GNSS).

According to an embodiment, the electronic device 101 may include a first antenna module 561, a second antenna module 563, and/or a third antenna module 565 to form directional beams. For example, the antenna modules 561, 563, and 565 may be used for 5G network (e.g., the second cellular network 494 of FIG. 5), mmWave communication, 60 GHz communication, or WiGig communication. In an embodiment, the antenna modules 561 to 565 may be disposed in the space to be spaced apart from metal members (e.g., the housing 310, the internal component 573, and/or the first to third antennas) of the electronic device 101. As another example, the antenna modules 561 to 565 may be disposed in the space to contact the metal members (e.g., the housing 310, and/or the first to third conductors 551 to 555) of the electronic device 101.

Figure 7A:
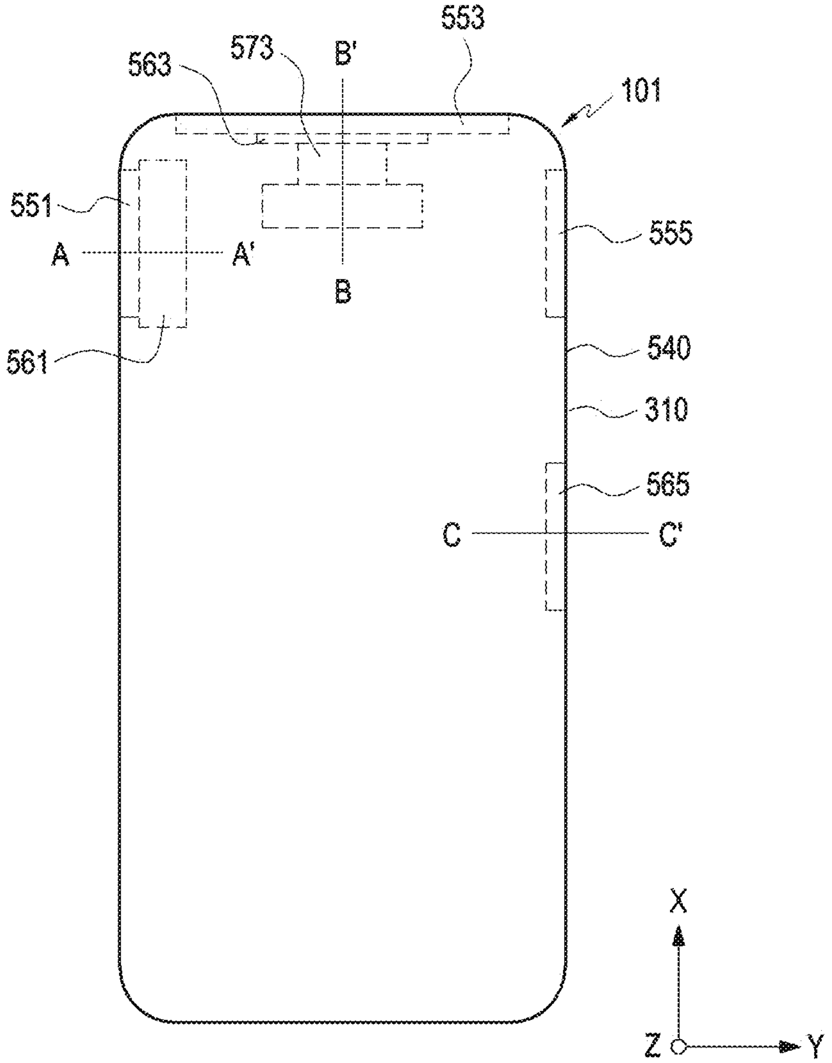
FIGS. 7A, 7B, 7C, and 7D are diagrams illustrating an example structure of the electronic device illustrated in FIG. 5, according to various embodiments.

Referring to FIG. 7A, according to an embodiment, the first antenna module 561 may be positioned at the left top (−Y axis), the second antenna module 563 may be positioned at the middle top (X axis), and the third antenna module 565 may be positioned at the right middle (Y axis). According to an embodiment, the electronic device 101 may include additional antenna modules in additional positions (e.g., the middle bottom (−Y axis)), or some of the first to third antenna modules 561 to 565 may be omitted. In an embodiment, the first to third antenna modules 561 to 565 may not be limited to FIG. 7A. According to an embodiment, the first to third antenna modules 561 to 565 may be electrically connected with at least one communication processor (e.g., the processor 120 of FIG. 5) on the PCB 571 using a conductive line 581 (e.g., a coaxial cable or FPCB).

Figure 7B:
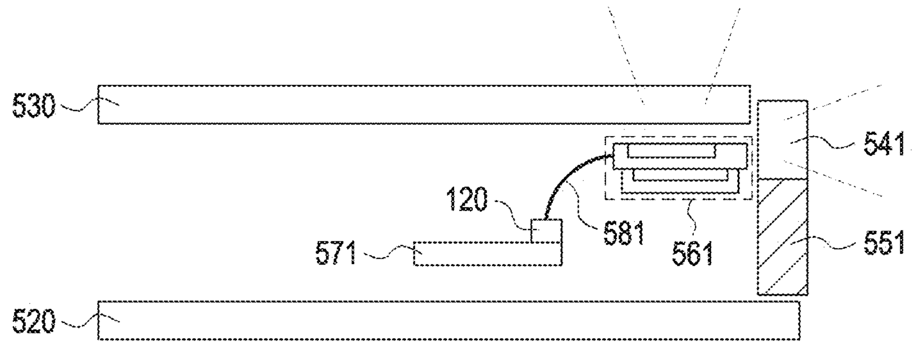
Figure 7C:
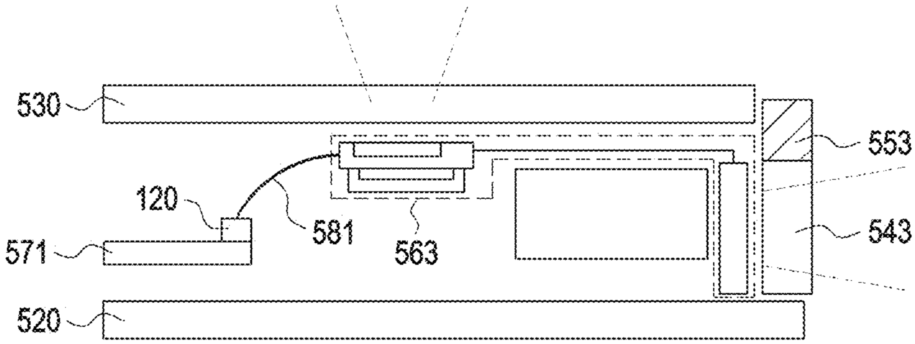

Referring to FIG. 7B illustrating a cross-section taken along the axis A-A' of FIG. 7A, in a first antenna module 561 including a first antenna array (not shown) or a second antenna array (not shown), the first antenna array may be disposed to radiate towards the second plate 530, and the second antenna array may be disposed to radiate through the first insulator 541. Referring to FIG. 7C which is a cross-sectional view taken along the axis B-B' of FIG. 7A, a first antenna array of a second antenna module 563 may be disposed to radiate towards the second plate 530, and a second antenna array may be disposed to radiate through the second insulator 543. In an embodiment, the first antenna array or the second antenna array may include a dipole antenna, a patch antenna, a monopole antenna, a slot antenna, or a loop antenna.

In an embodiment, the second antenna module 563 may include a first printed circuit board and a second printed circuit board electrically connected with the first printed circuit board. The first antenna array may be disposed on the first printed circuit board. The second antenna array may be disposed on the second printed circuit board. According to an embodiment, the first printed circuit board and the second printed circuit board may be connected through a flexible printed circuit board or a coaxial cable. The flexible printed circuit board or the coaxial cable may be disposed around an electrical object (e.g., a receiver, a speaker, sensors, a camera, an ear jack or a button).

Figure 7D:
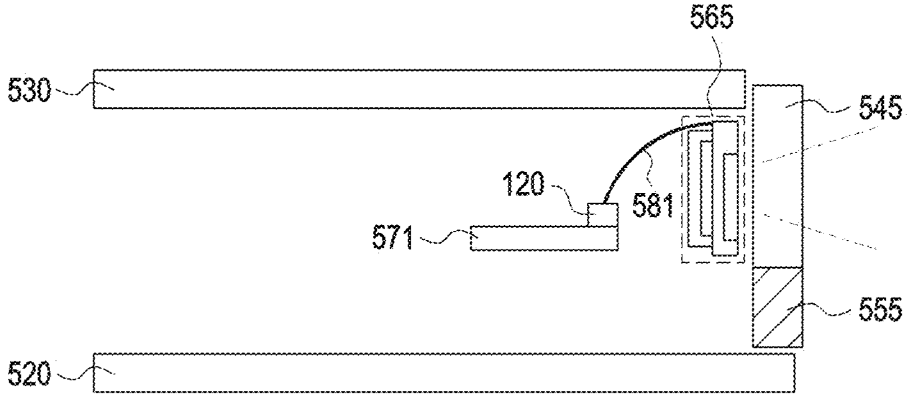

Referring to FIG. 7D which is a cross-sectional view taken along the axis C-C' of FIG. 7A, the third antenna module 565 may be disposed to radiate towards the side surface member 540 of the housing 310. For example, the antenna array of the third antenna module 565 may be disposed to radiate through the third insulator 545.

Figure 8A:
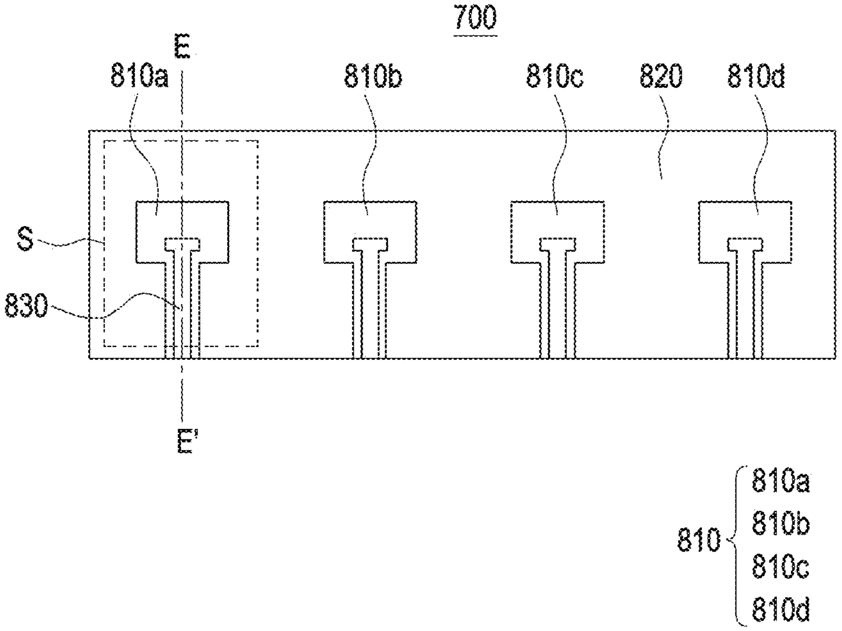
FIG. 8A is a top view illustrating an antenna module disposed in an electronic device, according to various embodiments.
Figure 8B:
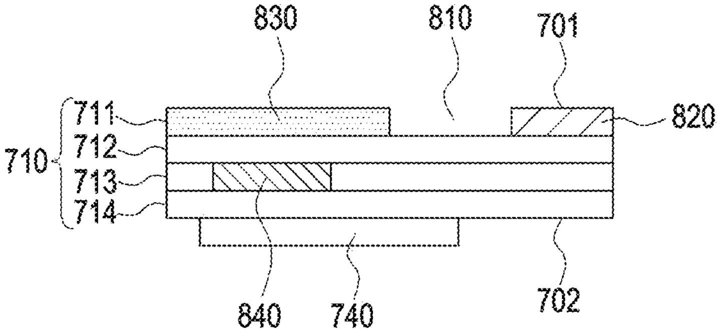
FIG. 8B is a cross-sectional view illustrating the antenna module of FIG. 8A, taken along line E-E' according to various embodiments.

FIG. 8A is a top view illustrating an antenna module disposed in an electronic device, according to various embodiments. FIG. 8B is a cross-sectional view illustrating the antenna module of FIG. 8A, taken along line E-E' according to various embodiments.

Referring to FIGS. 8A and 8B, an antenna module 700 may be positioned in an inner space of an electronic device (e.g., the electronic device 101 of FIGS. 1 to 5). For example, the electronic device may include a housing (e.g., the housing 310 of FIGS. 2 and 3) that forms at least a portion of the exterior, and in the inner space of the housing, a printed circuit board (e.g., the printed circuit board 340 of FIG. 4 or the printed circuit board 571 of FIG. 6B) and an antenna module 700 electrically connected with the printed circuit board may be positioned. The antenna module 700 may include an antenna structure 710 and a wireless communication circuit 740.

The antenna module 700 of FIGS. 8A and 8B may be identical in whole or part to the configuration of at least one of the antenna module 390 of FIG. 4 and the configuration of at least one of the first, second, and third antenna modules 442, 444, and 446 of FIG. 5, and the configuration of the antenna module of FIGS. 6A to 6C.

According to various embodiments, the antenna module 700 may include a printed circuit board including a plurality of conductive layers and insulating layers and a wireless communication circuit 740 disposed on the printed circuit board. For example, the antenna structure 710 may include a printed circuit board.

According to various embodiments, the antenna structure 710 may include a first surface 701 and a second surface 702 facing away from the first surface 701. For example, the antenna structure 710 may include a structure in which conductive layers and insulating layers are sequentially stacked from a first layer to an nth layer.

According to an embodiment, the antenna structure 710 may include a first layer 711 including a conductive plate 820 with an opening 810 and a second layer 712 including an insulator. The opening 810 may include a first opening (e.g., the first opening 811 of FIG. 9A) and a second opening (e.g., the second opening 812 of FIG. 9A) extending from the first opening. The opening 810 may operate as a slot antenna. According to an embodiment, a first conductive strip 830 for power feeding may be disposed in at least a portion of the first opening and the second opening and may be positioned on the first layer 711. However, the first conductive strip 830 may be disposed not on the first layer 711 but on another layer capable of supplying power to the conductive plate 820. For example, the first conductive strip 830 may be positioned on the second layer 712. As another example, if one insulating layer and one conductive layer are added between the second layer and the third layer in the antenna structure 710, the first conductive strip 830 may be disposed on the added conductive layer.

According to an embodiment, the antenna structure 710 may be disposed under the first layer 711 or the second layer 712 and may include a third layer 713 formed of a conductive layer and a fourth layer 714 formed of an insulating layer. According to an embodiment, a second conductive strip 840 for a second frequency band may be positioned on the third layer 713. However, the number of stacked substrates of the antenna structure 710 is not limited to the embodiment of FIG. 8B, and the design may be changed to include four or more layers.

According to various embodiments, the opening 810 formed in the first layer 711 may be disposed in the first surface 701 of the antenna structure 710 or in an inside closer to the first surface 701 than the second surface 702 of the antenna structure 710. In one conductive plate 820, an opening a 810*a*, an opening b 810*b*, an opening c 810*c*, and an opening d 810*d* may be formed in a designated pattern at predetermined intervals. The opening a 810*a* may include a first opening (e.g., the first opening 811 of FIG. 9A) formed inside the conductive plate and a second opening (e.g., the second opening 812 of FIG. 9A) extending from the first opening toward the edge of the conductive plate. In an embodiment, the shapes of the opening b 810*b*, the opening c 810*c*, and the opening d 810*d* may be substantially the same as the shape of the opening a 810*a*. The conductive plate 820 and the plurality of openings 810 may operate as a plurality of slot antennas. The plurality of slot antennas may form an antenna array.

According to various embodiments, the wireless communication circuit 740 may be disposed on a side of the area where the opening 810 of the antenna structure 710 is disposed or on a surface facing away from the surface where the opening 810 is disposed.

According to various embodiments, the plurality of openings 810 may be arranged side by side in a 4*1 array. For example, the plurality of openings 810 may be formed through the conductive plate 820 disposed in the antenna structure 710. In an embodiment, the plurality of openings 810 may be designed to be exposed to the outer surface of the antenna module 700. As another example, the plurality of openings 810 may not be exposed to the outer surface of the antenna module 700 due to an insulating layer covering the plurality of openings 810.

According to various embodiments, the wireless communication circuit 740 may be electrically connected with the antenna structure 710 and may receive communication signals with a designated frequency through a wireless transceiver (RF transceiver) or transmit received communication signals to the RF transceiver. The wireless communication circuit 740 may include at least a portion of the configuration of the third RFIC 426 of FIG. 5. For example, the wireless communication circuit 740 may perform wireless communication using slot antennas including the plurality of openings 810 under control of a processor (e.g., the processor 120 of FIG. 5). According to an embodiment, the wireless communication circuit 740 may receive control signals and power from a power management module (e.g., the power management module 188 of FIG. 1) or the processor 120 to process communication signals received from the outside or communication signals to be sent to the outside. For example, the wireless communication circuit 740 may include a switch circuit to split transmit and receive signals or various amplifiers or filters to raise the quality of transmit or receive signals.

According to an embodiment, the wireless communication circuit 740 may include a phase shifter to control the direction of the beam formed by the antenna module 700. For example, the wireless communication circuit 740 may provide phase difference feeding to control the directivity of the beam. The phase difference power may be useful in high-directivity communication schemes, such as mmWave communication (e.g., wireless communication adopting a frequency band of 6 GHz or more and 300 GHz or less).

According to an embodiment, the wireless communication circuitry 740 may be disposed on the second surface 702 of the antenna structure 710. A shielding member (not shown) for shielding the wireless communication circuit 740 may be disposed at the periphery of the wireless communication circuit 740. The shielding member may shield electromagnetic interference (EMI) and provide path to transfer the heat generated from the wireless communication circuit 740 to the bracket (e.g., the first supporting member 332 of FIG. 4) or a heat dissipation member. Various design changes may be made to the configuration disposed to surround the wireless communication circuit 740 for EMI shielding and/or efficient heat conduction in addition to the shielding member.

Figure 9A:
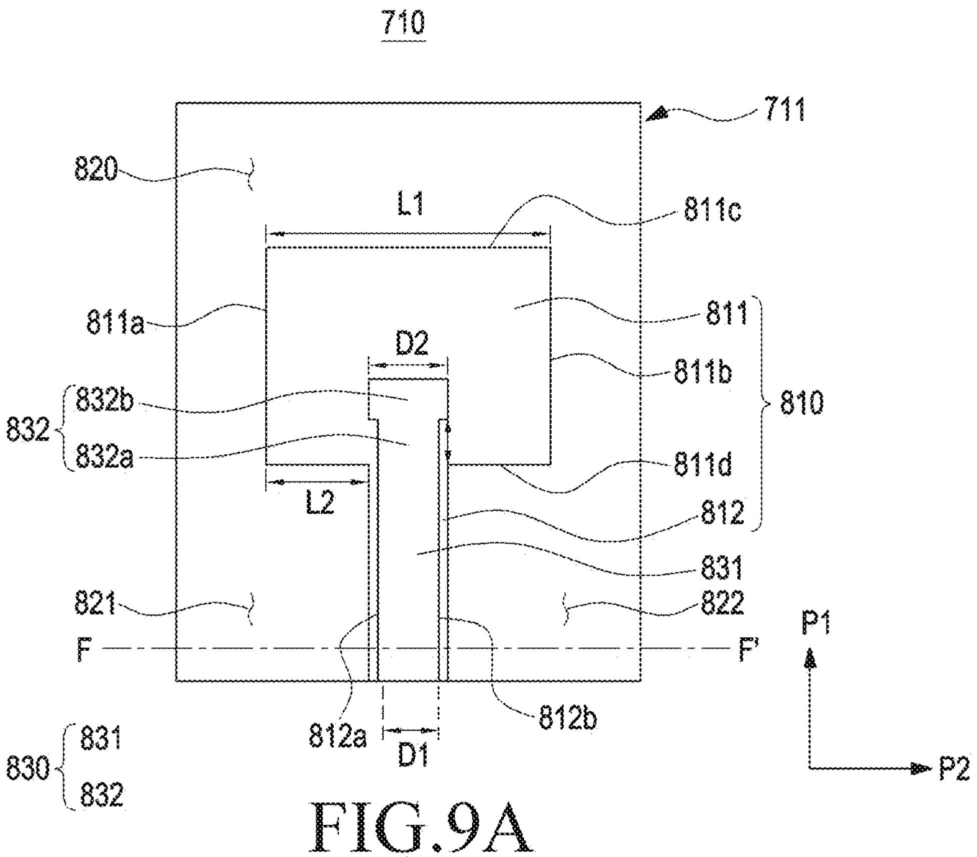
FIG. 9A is a front view illustrating one antenna of an antenna module according to various embodiments.
Figure 9B:
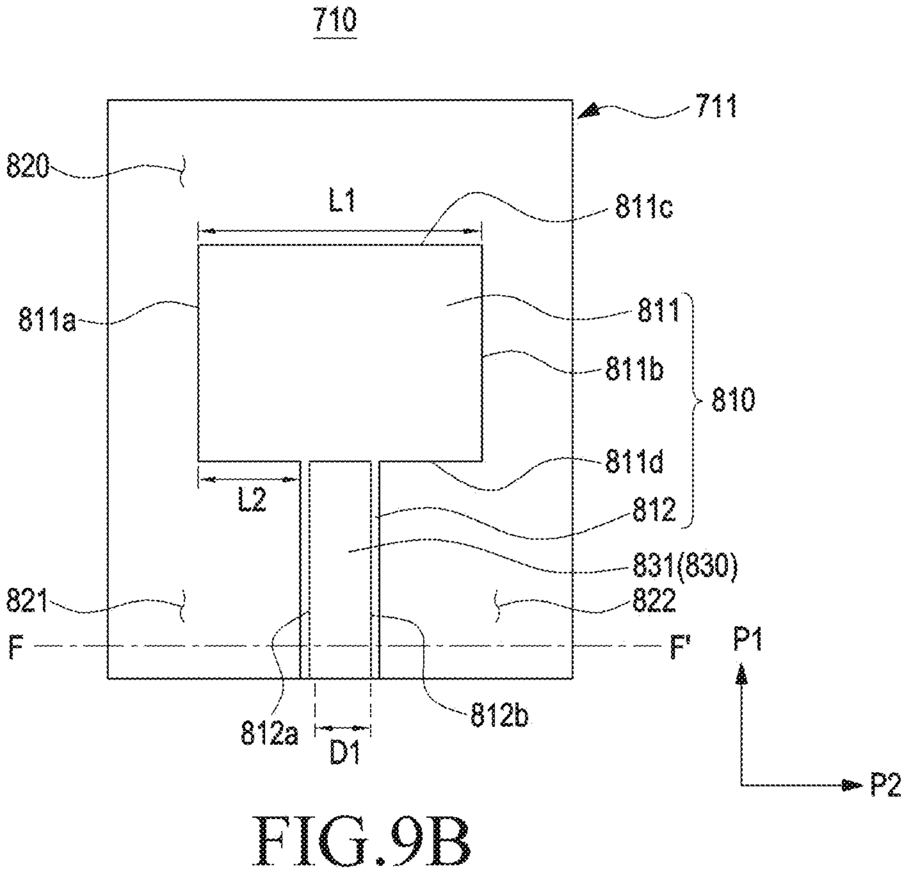
FIG. 9B is a front view illustrating one antenna of an antenna module according to various embodiments.
Figure 9C:
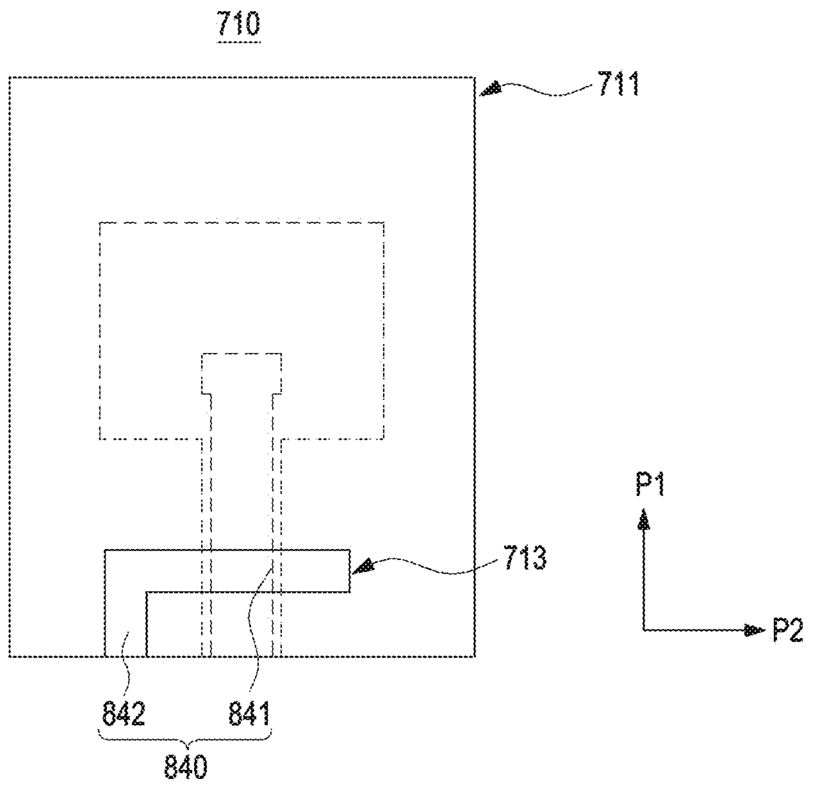
FIG. 9C is a rear view illustrating one antenna radiator of the antenna module, according to various embodiments.
Figure 9D:
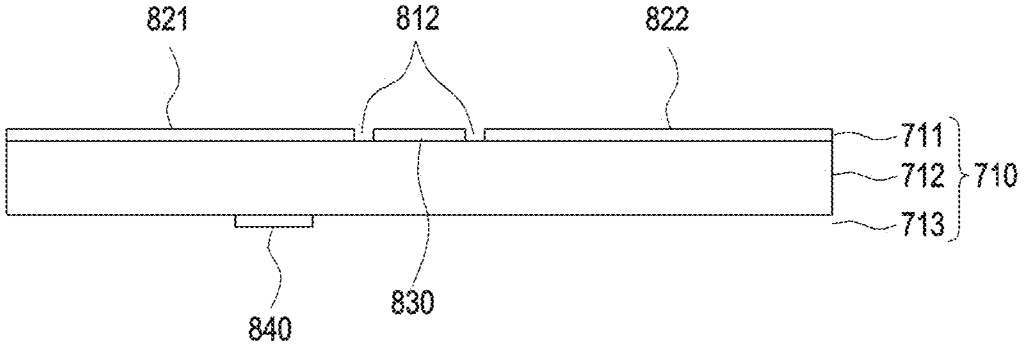
FIG. 9D is a cross-sectional view illustrating the antenna radiator of FIG. 9A, taken along line F-F' according to various embodiments.

FIG. 9A is a front view illustrating an antenna of an antenna module according to various embodiments. FIG. 9B is a front view illustrating an antenna of an antenna module according to various embodiments. FIG. 9C is a rear view illustrating an antenna of an antenna module according to various embodiments. FIG. 9D is a cross-sectional view illustrating the antenna of FIG. 9A, taken along line F-F' according to various embodiments.

The configuration of the antenna structure 710 of FIGS. 9A, 9B, 9C and 9D may be identical in whole or part to the configuration of the antenna structure 710 of FIGS. 8A and 8B. The antenna of the antenna structure 710 of FIGS. 9A, 9B, 9C, and 9D may be one (e.g., an antenna in the area S of FIG. 8A) of the plurality of antennas included in the antenna structure 710 of FIG. 8A.

According to various embodiments, the antenna structure 710 may include a conductive plate 820 including an opening 810, a first conductive strip 830 for first feeding, or a second conductive strip for second feeding 840. According to an embodiment, the conductive plate 820 and the first conductive strip 830 may be formed on the same layer, and that the first conductive strip 830 and the second conductive strip 840 may be formed on different layers. According to an embodiment, the conductive plate 820, the first conductive strip 830, and the second conductive strip 840 may be formed on different layers.

According to various embodiments, in the antenna structure 710, a first conductive layer 711, an insulating layer 712, and a second conductive layer 713 may be sequentially stacked. The first conductive layer 711 may include the first conductive strip 830 and/or the conductive plate 820 including the opening 810. The second conductive layer 713 may include the second conductive strip 840.

According to various embodiments, the opening 810 formed in the conductive plate 820 may include the first opening 811 and the second opening 812 extending from the first opening 811. For example, the first opening 811 may be disposed in a first area (e.g., the area S of FIG. 8A) of the antenna module 700 and may be formed in a square shape. The second opening 812 may have a rectangular shape extending from one side of the first opening 811 toward an end (e.g., an edge area) of the conductive plate 820. The first opening 811 and the second opening 812 may be integrally formed into a single opening.

According to an embodiment, the first opening 811 provided overall in a rectangular shape may include a 1-1th side 811*a* or a 1-2th side 811*b* extending along a first direction P1 and a 1-3th side 811*c* or a 1-4th side 811*d* extending along a second direction P2 substantially perpendicular to the first direction P1. One side of the 1-3th side 811*c* or the 1-4th side 811*d* may be segmented into a portion extending from the second opening 812. The second opening 812 provided overall in a rectangular shape may include a 2-1th side 812*a* or a 2-2th side 812*b* extending from the 1-4th side 811*d* and extending along the first direction P1. The length of the portion of the second opening 812 overlapping the 1-4th side 811*d* (the length of the portion formed along the second direction P) may be smaller than the 1-3th side 811*c* or 1-4th side 811*d* of the first opening 811. When viewed from above the conductive plate 820, the opening 810 may be formed overall in a 'T' shape.

According to various embodiments, the conductive plate 820 may form at least a portion of the upper surface of the antenna module 700, and its outer surface may be exposed. The conductive plate 820 may include the first opening 811 and the second opening 812. Portions formed on both sides of the second opening 812 may operate as a ground area. For example, the conductive plate 820 may include a first ground portion 821 and a second ground portion 822 formed to be spaced apart from each other with respect to the second opening 812.

According to various embodiments, when viewed from above the conductive plate 820, the antenna module 700 may be disposed to overlap the second opening 812 and may include the first conductive strip 830 for first feeding. For example, the first conductive strip 830 may provide a power feeding structure having a vertical polarization (V-polarization) characteristic. For example, the first conductive strip 830 or opening 810 may be designed to provide dual-band frequencies of 28 GHz and/or 39 GHz. In an embodiment, the first conductive strip 830 may be formed on the same layer as the conductive plate 820 and the antenna structure (e.g., the antenna structure 710 of FIG. 8A). As another example, the first conductive strip 830 may be formed on a different layer from the conductive plate 820 and the antenna structure.

According to an embodiment, when viewed from above the conductive plate 820, the first conductive strip 830 may be disposed inside the first opening 811 and/or the second opening 812 so as not to overlap the conductive plate 820. For example, the first conductive strip 830 is formed to extend from an end, facing outward of the second opening 812, to the 2-1th side 812*a* or the 2-2th side 812*b* of the second opening 812.

Referring to FIG. 9B according to an embodiment, the first conductive strip 830 may include a 1-1th strip portion 831. According to an embodiment, the 1-1th strip portion 831 may be disposed inside the second opening 812. For example, the 1-1th strip portion 831 may be a rectangular conductive plate and may be positioned to be spaced apart from the first ground portion 821 and the second ground portion 822 disposed in parallel on two opposite sides. According to an embodiment, referring to FIG. 9A, the first conductive strip 830 may include the 1-1th strip portion 831 or the 1-2th strip portion 832. According to an embodiment, the 1-1th strip portion 831 may be disposed inside the second opening 812. The 1-2th strip portion 832 may extend from an end of the 1-1th strip portion 831 to the inside of the first opening 811. For example, the 1-2th strip portion 832 may be a rectangular conductive plate that has substantially the same first width D1 as the 1-1th strip portion 831 and is disposed to face the central portion of the first opening 811. As another example, the 1-2th strip portion 832 may include a first extension 832*a* having a first width D1 and a second extension 832*a* extending from the first extension 832*a* to the central portion of the first opening 811 and having a second width D2. The second width D2 of the second extension 832*b* may be greater than the first width D1 of the first extension 832*a*. The 1-2th strip portion 832 and/or the first conductive strip 830 having different widths may be formed overall in a 'T' shape. However, the shapes of the 1-2th strip portion 832 and/or the first conductive strip 830 are not limited thereto, and various design changes may be made thereto.

According to various embodiments, in the antenna structure 710, the antenna structure including the conductive plate 820 having the opening 810 and the first conductive strip 830 may provide a coplanar waveguide (CPW)-type structure. For example, the first conductive strip 830 may operate as a radio frequency (RF) signal line, and the first ground portion 821 and the second ground portion 822 may operate as a ground for the RF signal line, thus forming a CPW-type structure.

According to an embodiment, in the antenna structure 710, at least a portion of the first conductive strip 830 may be disposed along the first direction P1 inside the second opening 812, and the first and second ground portions 821 and 822 may be disposed on two opposite sides of the center of the first conductive strip 830. The first conductive strip 830 may be, e.g., an RF signal line. The first conductive strip 830 may extend from the second opening 812 up to the inside of the first opening 811.

According to an embodiment, the first ground portion 821 and the second ground portion 822 spaced apart from each other may be disposed in parallel with each other with the first conductive strip 830 disposed therebetween. For example, the spacing between the first ground portion 821 and the first conductive strip 830 and/or the spacing between the second ground portion 822 and the first conductive strip 830 may be about 0.05 mm to about 0.12 mm. As another example, the spacing between the first ground portion 821 and the first conductive strip 830 and/or the spacing between the second ground portion 822 and the first conductive strip 830 may be about 0.1 mm.

According to various embodiments, the antenna structure 710 may include the second conductive strip 840 for second feeding different from the first feeding. For example, the second conductive strip 840 may provide a power feeding structure having a horizontal polarization (H-Polarization) characteristic. For example, the second conductive strip 840 or opening 810 may be designed to provide dual-band frequencies of about 28 GHz and/or about 39 GHz.

According to an embodiment, the second conductive strip 840 may form a different layer from the first conductive strip 830 and/or the conductive plate 820. When viewed from above the conductive plate 820, at least a portion of the second conductive strip 840 may be positioned to overlap at least a portion of the conductive plate 820 and the first conductive strip 830. For example, at least a portion of the second conductive strip 840 may be formed to cross the second opening 812.

According to an embodiment, the second conductive strip 840 may include a 2-1th strip portion 841 extending in the second direction P2 perpendicular to the first direction P1. For example, the 2-1th strip portion 841 may be a rectangular plate and, during the antenna operation, the second conductive strip 840 may be coupled in an area overlapping the first conductive strip 830. As another example, the second conductive strip 840 may be coupled with the conductive plate 820 around the opening 810 forming the antenna radiator by the second feeding. According to an embodiment, the second conductive strip 840 may include a 2-1th strip portion and a 2-2th strip portion 842 extending from an end of the 2-1th strip portion 841 to the edge of the antenna module 700. For example, the 2-2th strip portion 842 may be formed along the first direction P1 perpendicular to the second direction P2. The second conductive strip 840 may be formed overall in an "L" shape or inverted L shape. However, the shape of the second conductive strip 840 is not limited thereto, and various design changes may be made thereto.

Hereinafter, the operation of the antenna module 700 through the first conductive strip 830 for forming first feeding and the second conductive strip 840 for forming second feeding is described.

FIGS. 10A, 10B, 10C, and 10D are diagrams illustrating an electric field (E-field) operation for providing a vertical polarization (V-polarization) characteristic and a dual-band characteristic by a first conductive strip, according to various embodiments.

The configuration of the antenna structure of FIGS. 10A, 10B, 10C, and 10D may be identical in whole or part to the configuration of the antenna structure of FIGS. 9A, 9B, 9C and 9D.

Figure 10A:
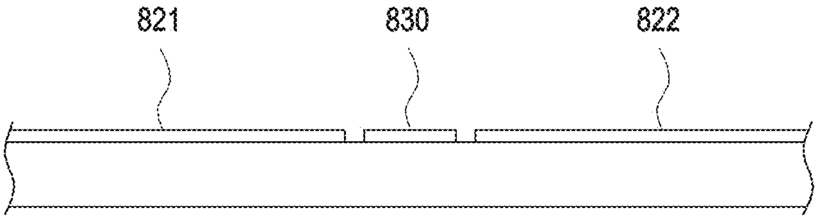
FIGS. 10A, 10B, 10C, and 10D are diagrams illustrating an electric field (E-field) operation for providing a vertical polarization (V-polarization) characteristic and a dual-band characteristic by a first conductive strip, according to various embodiments.
Figure 10B:
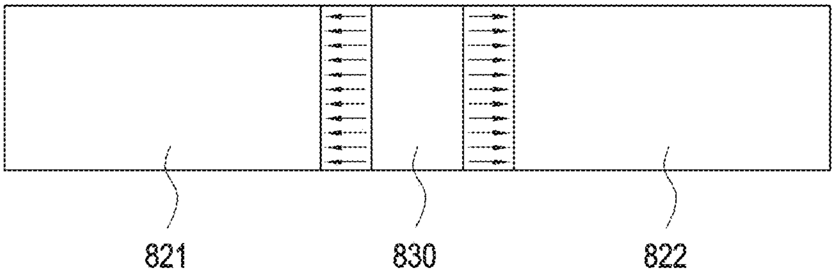
Figure 10C:
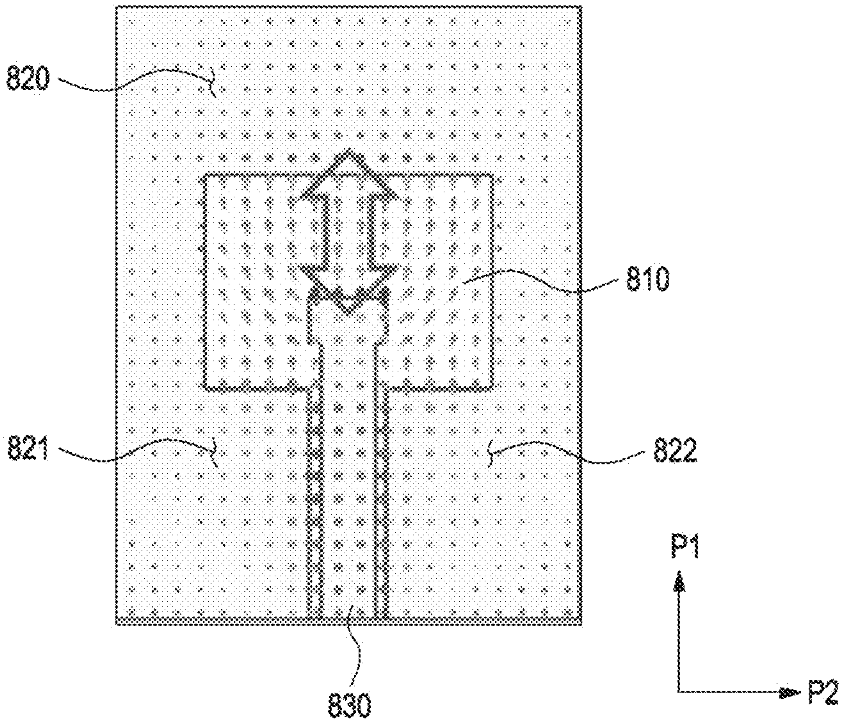
Figure 10D:
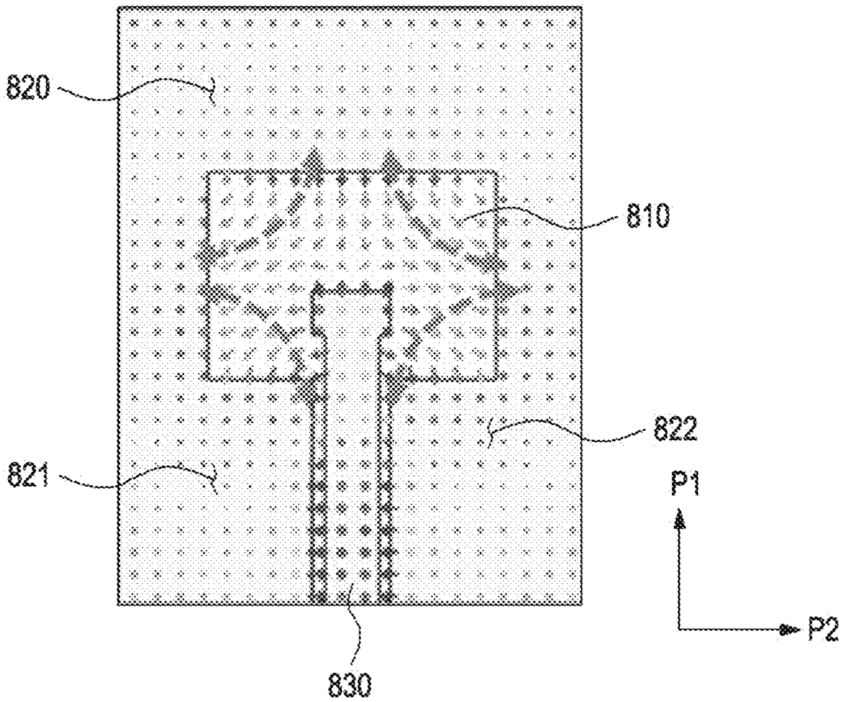

Referring to FIGS. 10A and 10B, if CPW feeding (e.g., the first feeding) is applied to the first conductive strip 830, the first conductive strip 830 may form a (+) pole, and the first ground portion 821 and the second ground portion 822 of the conductive plate 820 disposed on two opposite sides may form a (−) pole. Accordingly, an electric field (E-field) from the (+) pole to the (−) pole may be formed, and if the electric field is applied to the opening 810, it may operate as a dual-band antenna having different frequencies. Referring to FIG. 10B, the antenna module (e.g., the antenna module 700 of 8A) may form a field in the first direction P1 in the first frequency band (e.g., about 28 GHz) and may operate as a vertical polarization (V-polarization) antenna. Referring to FIG. 10C, the antenna module may form fields in the first direction P1 and the second direction P2 in the second frequency band (e.g., 39 GHz) and, as the fields facing in the second direction P2 are symmetrical and canceled out, only the fields facing in the first direction P1 are formed so that it may operate as a vertical polarization (V-polarization) antenna.

Figure 11A:
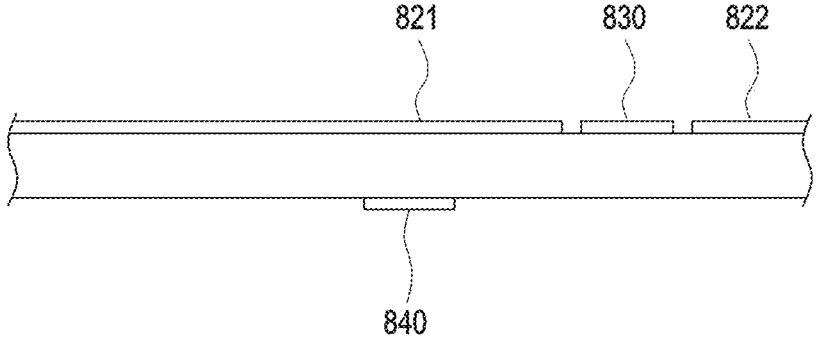
FIGS. 11A, 11B, and 11C are diagrams illustrating an electric field (E-field) operation for providing a horizontal polarization (H-polarization) characteristic and a dual-band characteristic by a second conductive strip, according to various embodiments.
Figure 11B:
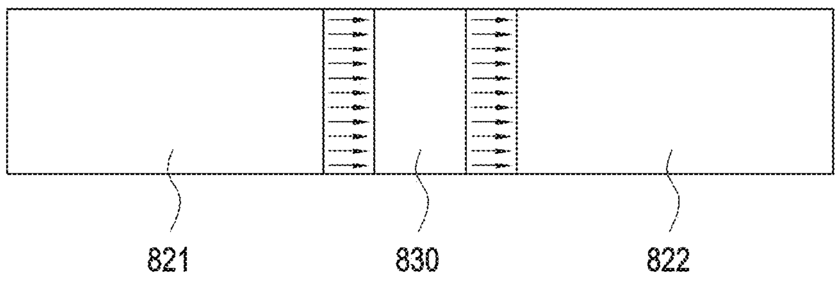
Figure 11C:
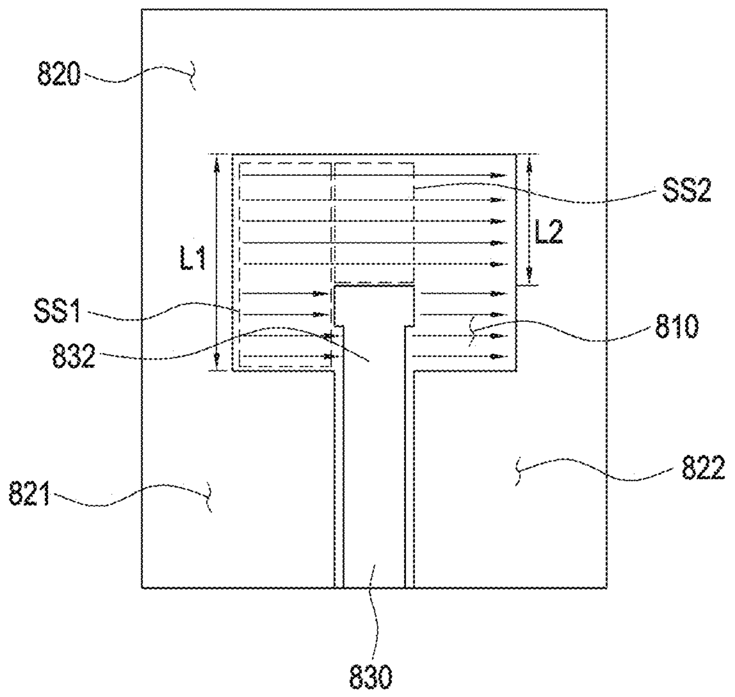

FIGS. 11A, 11B, and 11C are diagrams illustrating an electric field (E-field) operation for providing a horizontal polarization (H-polarization) characteristic and a dual-band characteristic by a second conductive strip, according to various embodiments.

The configuration of the antenna structure of FIGS. 11A, 11B and 11C may be identical in whole or part to the configuration of the antenna structure of FIGS. 9A, 9B, 9C and 9D. FIG. 11A illustrates a part of a cross-sectional view illustrating the antenna of FIG. 9A, taken along line F-F'.

Referring to FIGS. 11A and 11B, if coupled power is applied to the second conductive strip 840, the first ground portion 821 of the conductive plate 820 may form a (+) pole, and the second ground portion 822 of the conductive plate 820 may form a (−) pole. Accordingly, an electric field (E-field) from the (+) pole to the (−) pole may be formed, and the first opening 811 may operate as an antenna having different lengths by the 1-2th strip portion 832 extending to the inside the first opening 811. For example, as a first slot area SS1 of the first opening 811 having a first length L1 may operate in a first frequency band (e.g., 28 GHz), and a second slot area SS2 of the first opening 811 having a second length L2 operates in a second frequency band (e.g., 39 GHz), it may operate as a dual-H-polarization antenna.

According to various embodiments of the disclosure, the antenna module 700 may implement an antenna structure capable of supporting multiple-input/multiple-output (MIMO) or diversity in a high frequency band (28 GHz/39 GHz), such as millimeter wave (mmWave) using a single aperture-shaped antenna radiator.

Figure 12A:
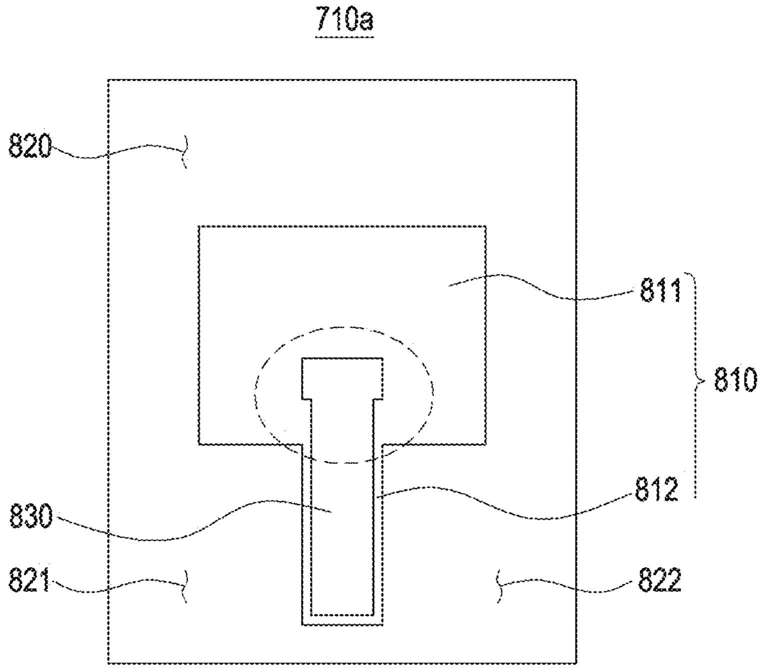
FIG. 12A is a front view illustrating one antenna of an antenna module according to various embodiments.
Figure 12B:
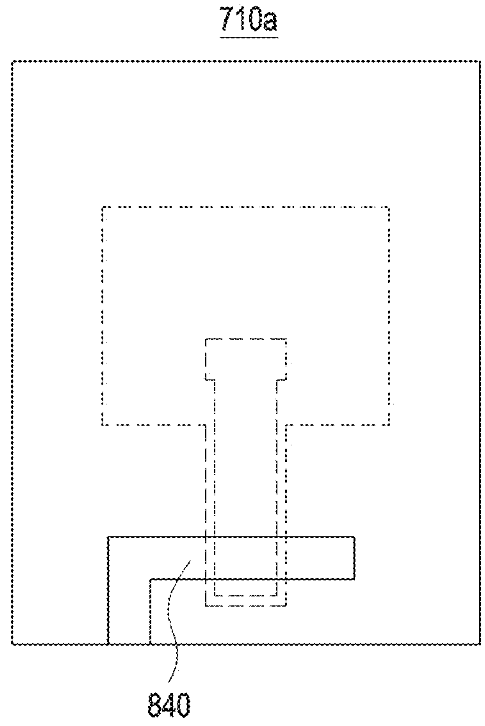
FIG. 12B is a rear view illustrating one antenna of an antenna module according to various embodiments.

FIG. 12A is a front view illustrating an antenna of an antenna module according to various embodiments. FIG. 12B is a rear view illustrating an antenna of an antenna module according to various embodiments.

The configuration of the antenna structure 710*a* of FIGS. 12A and 12B may be identical in whole or part to the configuration of the antenna structure 710 of FIGS. 9A, 9B, 9C and 9D. The antenna of the antenna structure 710*a* of FIGS. 12A and 12B may be one (e.g., an antenna in the area S of FIG. 8A) of the plurality of antennas included in the antenna module 700 of FIG. 8A.

According to various embodiments, the antenna structure 710*a* may include a conductive plate 820 including the opening 810, the first conductive strip 830 for first feeding, and/or the second conductive strip 840 for second feeding. According to an embodiment, the conductive plate 820 and the first conductive strip 830 may be formed on the same layer, and that the first conductive strip 830 and the second conductive strip 840 may be formed on different layers. According to an embodiment, the conductive plate 820, the first conductive strip 830, and the second conductive strip 840 may be formed on different layers.

A configuration different from the configuration of the antenna structure 710 of FIGS. 9A, 9B and 9C is mainly described below. In an embodiment, the opening 810 may be formed in a closed loop shape.

According to various embodiments, the opening 810 may include the first opening 811 and the second opening 812 extending from the first opening 811. For example, the first opening 811 may be disposed in an area S (e.g., the area S of FIG. 8A) of the antenna module 700 and may be formed in a square shape. The second opening 812 may have a rectangular shape extending from one side of the first opening 811 toward an end of the conductive plate 820. The first opening 811 and the second opening 812 may be integrally formed into a single opening. For example, one side of the second opening 812 may be open toward the first opening 811, and the other side facing the end of the conductive plate 820 may not be open.

According to various embodiments, the conductive plate 820 may form at least a portion of the upper surface of the antenna structure 710*a*, and its outer surface may be exposed. The conductive plate 820 may include the first opening 811 and the second opening 812. Portions formed on both sides of the second opening 812 may operate as a ground area. For example, the conductive plate 820 may include a first ground portion 821 and a second ground portion 822 formed to be spaced apart from each other with respect to the second opening 812.

According to various embodiments, when viewed from above the conductive plate 820, the antenna structure 710*a* may be disposed to overlap the second opening 812 and may include the first conductive strip 830 for first feeding. For example, the first conductive strip 830 may be positioned inside the opening 810 to be spaced apart from the second opening 812. The first conductive strip 830 may be electrically connected with the wireless communication circuit 740 through a conductive via. The first conductive strip 830 may provide a power feeding structure having a vertical polarization (V-polarization) characteristic. For example, the first conductive strip 830 or opening 810 may be designed to provide dual-band frequencies of about 28 GHz and/or about 39 GHz.

According to various embodiments, the antenna structure 710*a* may include the second conductive strip 840 for second feeding different from the first feeding. For example, the second conductive strip 840 may provide a power feeding structure having a horizontal polarization (H-Polarization) characteristic. For example, the second conductive strip 840 or opening 810 may be designed to provide dual-band frequencies of about 28 GHz and/or about 39 GHz.

Figure 13A:
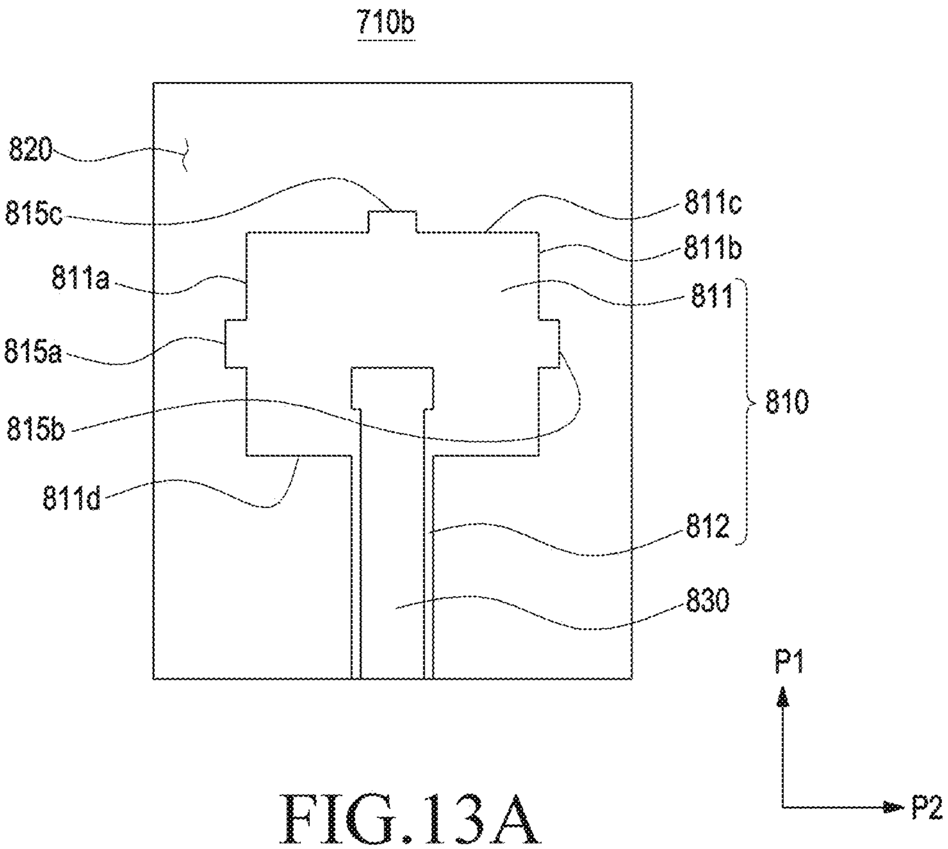
FIG. 13A is a front view illustrating one antenna of an antenna module according to various embodiments.
Figure 13B:
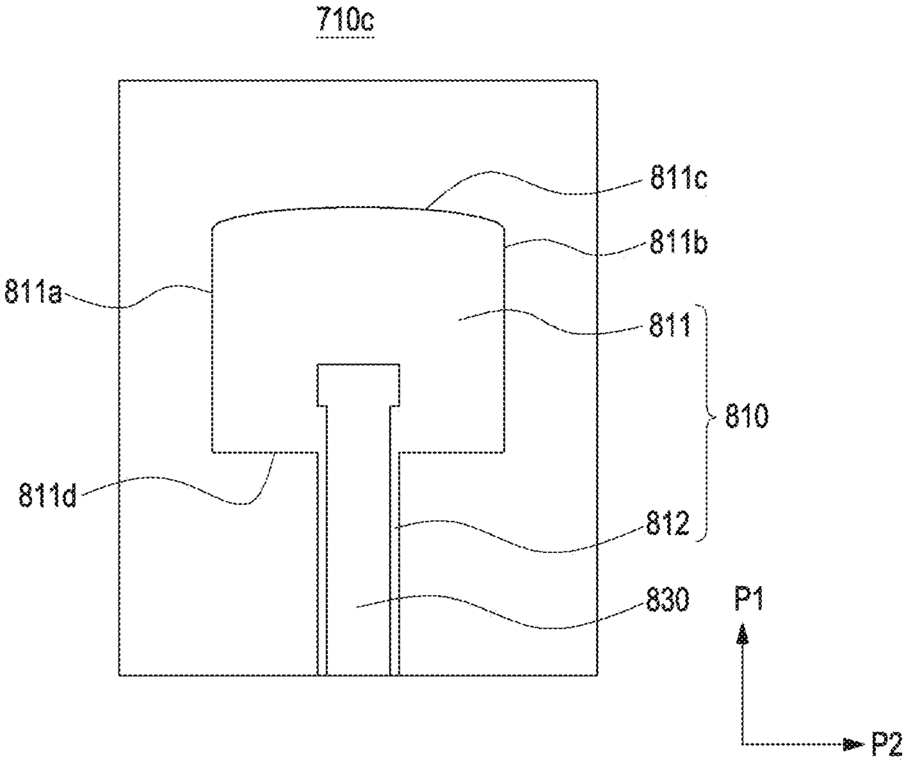
FIG. 13B is a front view illustrating one antenna of an antenna module according to various embodiments.
Figure 13C:
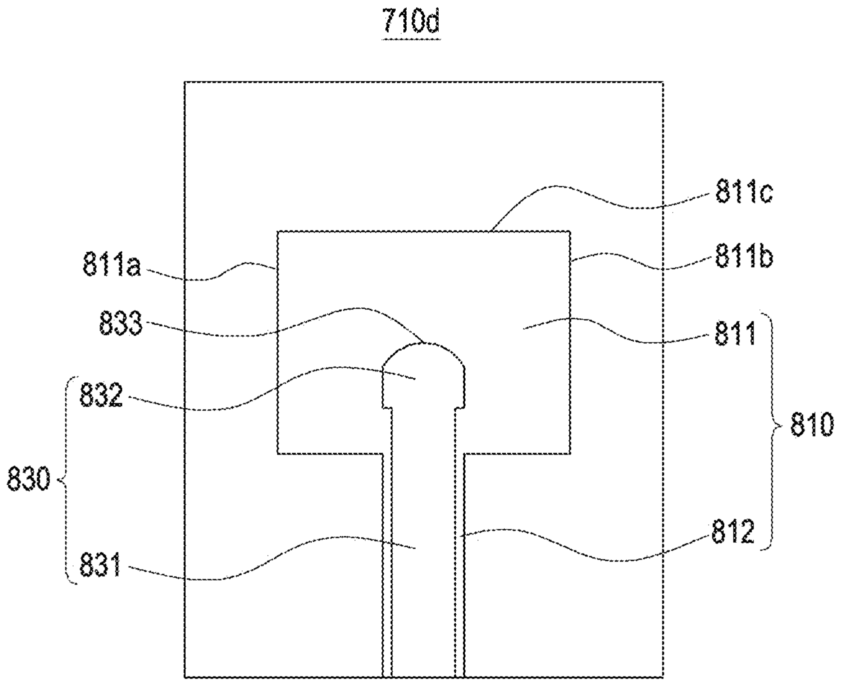
FIG. 13C is a front view illustrating one antenna of an antenna module according to various embodiments.

FIG. 13A is a front view illustrating an antenna of an antenna module according to various embodiments. FIG. 13B is a front view illustrating an antenna of an antenna module according to various embodiments. FIG. 13C is a front view illustrating an antenna of an antenna module according to various embodiments.

The configuration of the antenna structures 710*b*, 710*c*, and 710*d* of FIGS. 13A, 13B and 13C may be identical in whole or part to the configuration of the antenna structure 710 of FIGS. 9A, 9B, 9C and 9D. The antenna of the antenna structures 710*b*, 710*c*, and 710*d* of FIGS. 13A, 13B and 13C may be one (e.g., an antenna in the area S of FIG. 8A) of the plurality of antennas arranged in the antenna module 700 of FIG. 8A.

A configuration different from the configuration of the antenna structure 710 of FIGS. 9A, 9B, 9C, and 9C is mainly described below.

According to various embodiments, the antenna structures 710*b*, 710*c*, and 710*d* may include a conductive plate 820 including an opening 810 or a first conductive strip 830 for first feeding.

Referring to FIG. 13A, the opening 810 formed in the conductive plate 820 may include the first opening 811 and the second opening 812 extending from the first opening 811. For example, the first opening 811 may be disposed in an area S (e.g., the area S of FIG. 8A) of the antenna module and may be formed in a square shape including at least one recess portion 815. The second opening 812 may have a rectangular shape extending from one side of the first opening 811 to an end of the conductive plate 820. The first opening 811 and the second opening 812 may be integrally formed into a single opening.

According to an embodiment, when viewed from above the conductive plate 820 of FIG. 13A, there may be included a 1-1th side 811*a* extending along a first direction P1 and forming a left side, a 1-2th side 811*b* extending along the first direction P1 and forming a right side, a 1-3th side 811*c* extending along a second direction P2 perpendicular to the first direction P1 and forming an upper side, or a 1-4th side 811*d* extending along the second direction P2 and forming a lower side. One side of the 1-4th side 811*d* may be segmented into a portion extending from the second opening 812. According to an embodiment, a portion of the 1-1th side 811*a* may include a first recess portion 815*a*. A portion of the 1-2th side 811*b* may include a second recess portion 815*b*. A portion of the 1-3th sides 811*c* may include a third recess portion 815*c*. The first recess portion 815*a*, the second recess portion 815*b*, and/or the third recess portion 815*c* formed to have substantially the same shape may change the frequency band of the antenna including the first opening 811. However, the shapes of the first recess portion 815*a*, the second recess portion 815*b*, and/or the third recess portion 815*c* of the first opening 811 are not limited thereto and may be formed in plurality in each side or changed in design to have a different shape. For example, the shape of the first recess portion 815*a*, the second recess portion 815*b*, and/or the third recess portion 815*c* may be a circle or a polygon, such as a triangle or a rectangle. As another example, some of the first recess portion 815*a*, the second recess portion 815*b*, and/or the third recess portion 815*c* may be omitted, or a fourth recess portion (not shown) or a fifth recess portion (not shown) may be added.

Referring to FIG. 13B, the opening 810 formed in the conductive plate 820 may include the first opening 811 and the second opening 812 extending from the first opening 811. For example, the first opening 811 may be disposed in an area S (e.g., the area S of FIG. 8A) of the antenna module and at least a portion thereof may include a curved side. The second opening 812 may have a rectangular shape extending from one side of the first opening 811 to an end of the conductive plate 820. The first opening 811 and the second opening 812 may be integrally formed into a single opening.

According to an embodiment, when viewed from above the conductive plate 820 of FIG. 13B, there may be included a 1-1th side 811*a* extending along a first direction P1 and forming a left side, a 1-2th side 811*b* extending along the first direction P1 and forming a right side, a 1-3th side 811*c* extending along a second direction P2 perpendicular to the first direction P1 and forming an upper side, or a 1-4th side 811*d* extending along the second direction P2 and forming a lower side. One side of the 1-4th side 811*d* may be segmented into a portion extending from the second opening 812. According to an embodiment, at least a portion of the 1-3th side 811*c* may form a curved surface. The 1-3th side 811*c* including the curved surface may change the frequency band of the antenna including the first opening 811. However, the first opening 811 is not limited to the curved shape of the 1-3th side 811*c*, but various design changes may be made thereto, e.g., as at least a portion of the 1-1th side 811*a*, the 1-2th side 811*b*, or the 1-4th side 811*d* forms a curved surface.

Referring to FIG. 13C, the opening 810 formed in the conductive plate 820 may include the first opening 811 and the second opening 812 extending from the first opening 811. For example, the first opening 811 may be disposed in an area S (e.g., the area S of FIG. 8A) of the antenna module, and the second opening 812 may have a rectangular shape extending from one side of the first opening 811 to an end of the conductive plate 820. The first opening 811 and the second opening 812 may be integrally formed into a single opening.

According to various embodiments, when viewed from above the conductive plate 820, the antenna structure 710*d* may be disposed to overlap the second opening 812 and may include the first conductive strip 830 for first feeding. The first conductive strip 830 may include a 1-1th strip portion 831 disposed inside the second opening 812 and a 1-2th strip portion 832 extending from the 1-1th strip portion 831 to the inside of the first opening 811. According to an embodiment, at least a portion of an end of the 1-2th strip portion 832 may form a curved surface 833. The frequency of the antenna may be changed by the curved surface 833.

Figure 14:
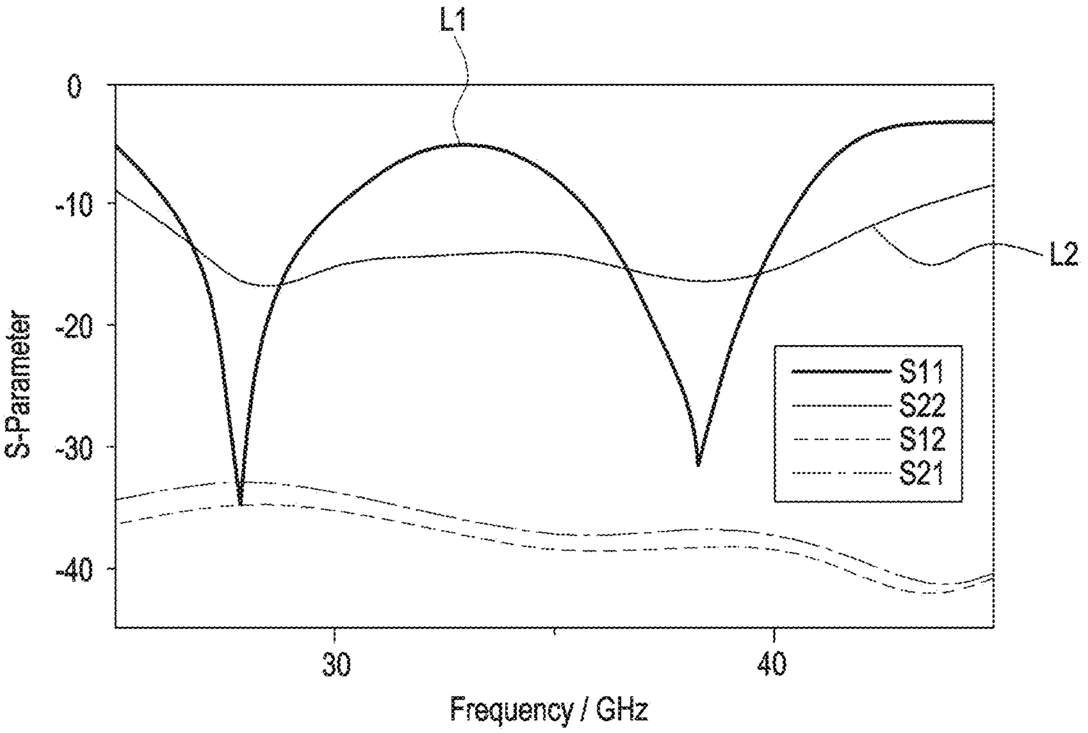
FIG. 14 is a graph illustrating a return loss for each frequency band of an antenna module, according to various embodiments.

FIG. 14 is a graph illustrating a return loss for each frequency band of an antenna module, according to various embodiments. FIGS. 15A, 15B, 15C, and 15D are graphs illustrating the directivity of an antenna module, according to various embodiments.

The antenna module of FIGS. 14, 15A, 15B, 15C and 15D may be identical in whole or part to the configuration of at least one of the antenna module 390 of FIG. 4 and the first, second, and third antenna modules 442, 444 and 446 of FIG. 5, the configuration of the antenna disposed on the printed circuit board 571 of FIGS. 7A to 7D, and the configuration of the antenna structures 710, 710*a*, 710*b*, 710*c*, and 710*d* of FIGS. 8A to 11C.

FIG. 14 may identify the return loss according to the frequency range of the antenna module of the disclosure. The signal transmitted and/or received by the antenna module may be a signal having a frequency between 6 GHz and 300 GHz.

Referring to FIG. 14, the vertical polarization (V-polarization) characteristic for each frequency band may be identified through the line L1, and the horizontal polarization (H-polarization) characteristic for each frequency band may be identified through the line L2. The line L1 shows the S-parameter characteristic of operating while providing an isolation of −30 dB or more in the 28 GHz band and the 39 GHz band. According to an embodiment, the antenna module may restrict coupling of a signal band for vertical polarization (V-polarization) and a signal band for horizontal polarization (H-polarization) to each other, thereby preventing and/or reducing antenna performance degradation. Therefore, it is possible to design an antenna structure that supports dual-band of the first frequency band (e.g., about 28 GHz) and the second frequency band (e.g., about 39 GHz) and hence an antenna module capable of a dual-band and dual-polarization antenna.

Figure 15A:
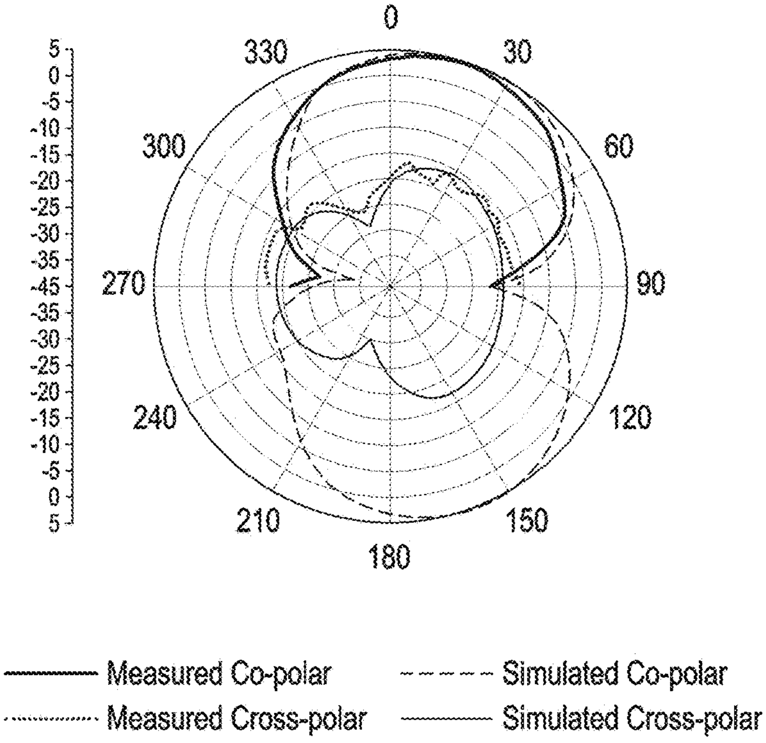
FIGS. 15A, 15B, 15C, and 15D are graphs illustrating directivity of an antenna module, according to various embodiments.
Figure 15B:
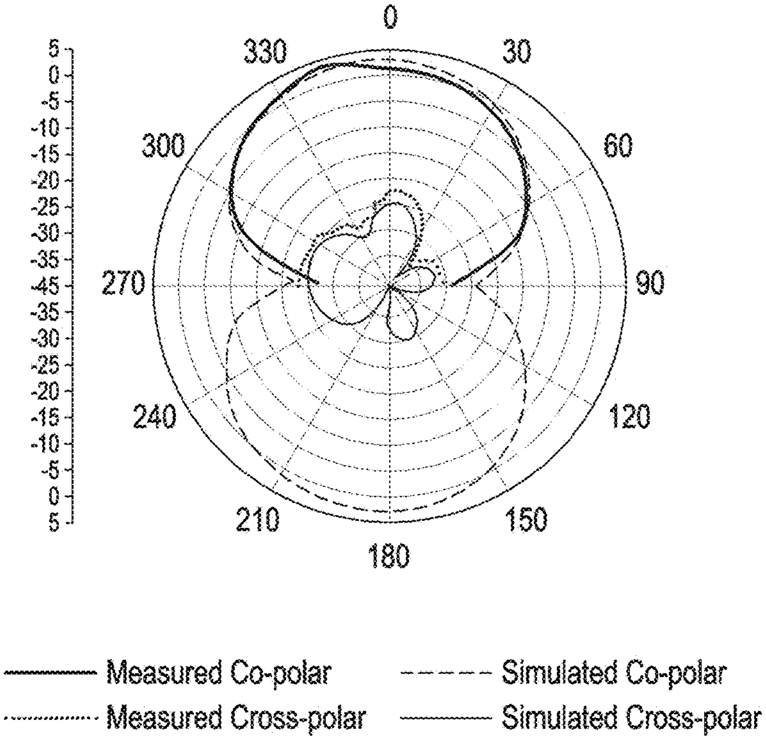
Figure 15C:
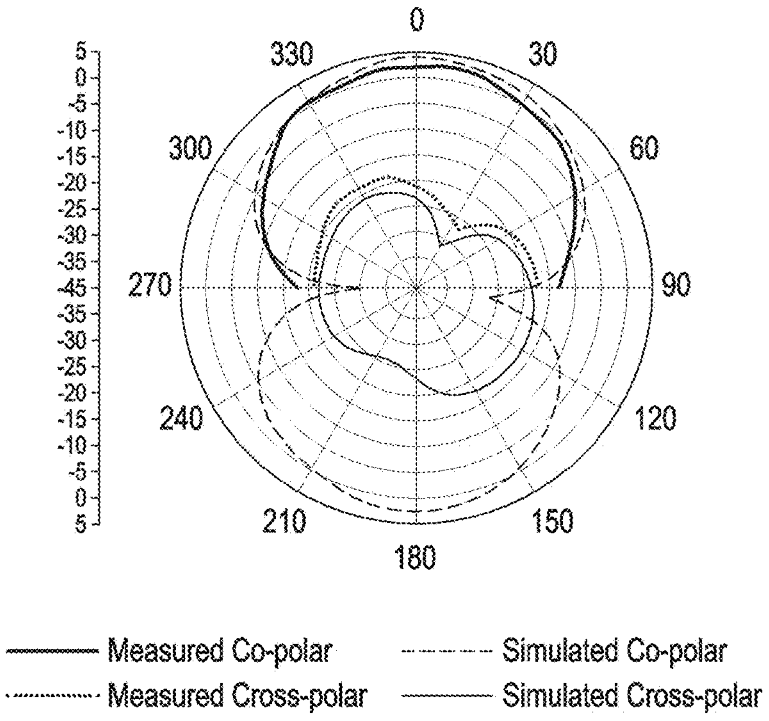

FIG. 15A is a graph of the directivity of an antenna module for showing vertical polarization (V-polarization) characteristics in a band of about 28 GHz, and FIG. 15B is a graph of the directivity of an antenna module for showing vertical polarization (V-polarization) characteristics in a band of about 39 GHz. FIG. 15C is a graph of the directivity of an antenna module for showing horizontal polarization (H-polarization) characteristics in a band of about 28 GHz, and FIG. 15D is a graph of the directivity of an antenna module for showing horizontal polarization (H-polarization) characteristics in a band of about 39 GHz.

FIG. 15A illustrates that the measured main lobe magnitude of the antenna module is about 4.12 dBi, and FIG. 15B illustrates that the measured main lobe magnitude of the antenna module is about 3.79 dBi. As the measured values and the simulated values show similar values, it may be identified that advantageous antenna performance (e.g., gain and/or directivity) is provided.

Figure 15D:
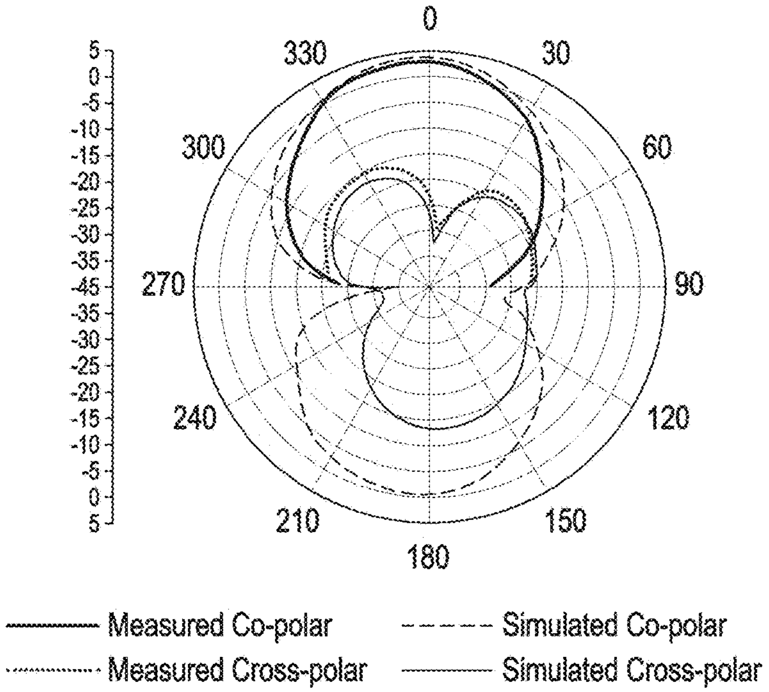

FIG. 15C illustrates that the measured main lobe magnitude of the antenna module is about 3.74 dBi, and FIG. 15D illustrates that the measured main lobe magnitude of the antenna module is about 3.89 dBi. As the measured values and the simulated values show similar values, it may be identified that advantageous antenna performance (e.g., gain and/or directivity) is provided.

According to various example embodiments of the disclosure, an electronic device (e.g., the electronic device 101 of FIGS. 1 to 5) may comprise: a housing (e.g., the housing 310 of FIGS. 2 and 3) forming at least a portion of an exterior of the electronic device, a printed circuit board (e.g., the printed circuit board 340 of FIG. 4) disposed in an inner space of the housing, and an antenna structure (e.g., the antenna structure 710 of FIG. 9A) including at least one antenna positioned in the inner space and electrically connected with the printed circuit board. The antenna structure may include: a first layer (e.g., the first layer 711 of FIG. 8B) including a conductive plate (e.g., the conductive plate 820 of FIG. 9A) having an opening, the opening including a first opening (e.g., the first opening 811 of FIG. 9A) and a second opening (e.g., the second opening 812 of FIG. 9A) extending from the first opening toward an edge of the conductive plate, a first conductive strip (e.g., the first conductive strip 830 of FIG. 9A) at least partially disposed inside the second opening to form a first feed, and a second conductive strip (e.g., the second conductive strip 840 of FIG. 9C) for forming a second feed different from the first feed. The electronic device may further comprise a wireless communication circuit (e.g., the wireless communication circuit 740 of FIG. 8B) electrically connected with the first conductive strip and/or the second conductive strip and configured to transmit and/or receive a radio frequency (RF) signal having a frequency in a range of about 3 GHz to 300 GHz.

According to various example embodiments, the first conductive strip may be disposed in parallel along a first length direction of the second opening, and at least a portion of the second conductive strip may be disposed along a second length direction different from the first length direction.

According to various example embodiments, the first length direction and the second length direction may be perpendicular to each other.

According to various example embodiments, the first layer and a second layer may form the same layer.

According to various example embodiments, an antenna module may include a first layer including the conductive plate, a second layer including the first conductive strip, a third layer including the second conductive strip, and the wireless communication circuit.

According to various example embodiments, when viewed from above the first conductive strip, a portion of the first conductive strip may be disposed to overlap a portion of the second conductive strip.

According to various example embodiments, the first layer and the third layer may form different layers.

According to various example embodiments, when viewed from above the first layer and the third layer, a portion of the second conductive strip may be disposed to cross the second opening.

According to various example embodiments, the conductive plate may include a first ground portion (e.g., the first ground portion 821 of FIG. 9A) and a second ground portion (e.g., the second ground portion 822 of FIG. 9A) spaced apart from each other on two opposite sides of the second opening and providing a ground area.

According to various example embodiments, the first ground portion and the second ground portion may be disposed on two opposite sides of the second opening to have a same spacing with respect to the first conductive strip. The first conductive strip may be positioned coplanar with the first ground portion and the second ground portion.

According to various example embodiments, the first layer may form an antenna array in which a plurality of openings are arrayed to form a designated pattern at a specified interval in the conductive plate.

According to various example embodiments, the first conductive strip may include a first first strip portion (e.g., the 1-1th strip portion 831 of FIG. 9A) positioned inside the second opening and a second first strip portion (e.g., the 1-2th strip portion 832 of FIG. 9A) extending from an end of the first first strip portion to an inside of the first opening.

According to various example embodiments, the second first strip portion may include a first extension (e.g., the first extension 832*a* of FIG. 9A) having a first width (e.g., the first width D1 of FIG. 9A) and a second extension (e.g., the second extension 832*b* of FIG. 9A) extending from the first extension to a central portion of the first opening and having a second width (e.g., the second width D2 of FIG. 9A). The second width of the second extension may be greater than the first width of the first extension.

According to various example embodiments, the second conductive strip may include a first second strip portion (e.g., the 2-1th strip portion 841 of FIG. 9B) extending in a direction perpendicular to a length direction of the first conductive strip.

According to various example embodiments, the second conductive strip may include a first second strip portion (e.g., the 2-1th strip portion 841 of FIG. 9B) extending in a direction perpendicular to a length direction of the first conductive strip and a second second strip portion (e.g., the 2-2th strip portion 842 of FIG. 9B) disposed in parallel with the length direction of the first conductive strip and extending from an end of the first second strip portion to an edge of the antenna module.

According to various example embodiments, an antenna module (e.g., the antenna module 700 of FIG. 9A) may comprise: a first layer (e.g., the first layer 711 of FIG. 8B) including a first opening (e.g., the first opening 811 of FIG. 9A) and a second opening (e.g., the second opening 812 of FIG. 9A) extending from the first opening in a first length direction, the first layer being formed of a conductive plate, a second layer (e.g., the first layer 711 or second layer 712 of FIG. 8B) disposed in parallel along the first length direction of the second opening, positioned to at least partially extend to or face an inside of the first opening, and including a first conductive strip (e.g., the first conductive strip 830 of FIG. 9A) forming a first feed, a third layer (e.g., the third layer 713 of FIG. 8B) at least partially extending along a second length direction different from the first length direction and including a second conductive strip (e.g., the second conductive strip 840 of FIG. 9A) forming a second feed, and a wireless communication circuit (e.g., the wireless communication circuit 740 of FIG. 8B) electrically connected with the first conductive strip and/or the second conductive strip and configured to transmit and/or receive a radio frequency (RF) signal.

According to various example embodiments, when viewed from above the antenna module, a portion of the first conductive strip may be disposed to overlap the second conductive strip.

According to various example embodiments, the first length direction and the second length direction may be perpendicular to each other.

According to various example embodiments, the first layer and the second layer may form a same layer.

According to various example embodiments, the first layer may include the conductive plate surrounding at least a portion of the first opening and the second opening. A first portion and a second portion of the conductive plate being spaced apart from each other on two opposite sides of the second opening may provide a ground area.

According to various example embodiments, the first layer may form an antenna array in which a plurality of openings are arrayed to form a designated pattern at a specified interval in the conductive plate.

It will be understood by one of ordinary skill in the art that the antenna module and the electronic device including the same according to various example embodiments of the present disclosure as described above are not limited to the above-described embodiments and those illustrated in the drawings, and various changes, modifications, or alterations may be made thereto without departing from the scope of the present disclosure. It will be further understood by those skilled in the art that any of the embodiment(s) described herein may be used in conjunction with any other embodiment(s) described herein.

What is claimed is:

1. An electronic device, comprising:

a housing forming at least a portion of an exterior of the electronic device;

a printed circuit board disposed in an inner space of the housing;

an antenna structure including at least one antenna positioned in the inner space and electrically connected with the printed circuit board, the antenna structure including:

a conductive plate having an opening, the opening including a first opening and a second opening extending from the first opening toward an edge of the conductive plate;

a first conductive strip forming a first frequency band and disposed within the first opening and the second opening; and a second conductive strip forming a second feed for a second frequency band different from the first frequency band; and a wireless communication circuit electrically connected with the first conductive strip and/or the second conductive strip and configured to transmit and/or receive a radio frequency (RF) signal having a frequency in a range of about 3 GHz to 300 GHz, wherein the conductive plate comprises a first ground portion and a second ground portion spaced apart from each other with respect to the second opening and configured to electrically couple to the second conductive strip, wherein, when viewed from above the conductive plate, a first area where the second conductive strip overlaps with the first ground portion is greater than a second area where the second conductive strip overlaps with the second ground portion.

2. The electronic device of claim 1, wherein the first conductive strip is disposed in parallel along a first length direction of the second opening, and wherein at least a portion of the second conductive strip is disposed along a second length direction different from the first length direction.

3. The electronic device of claim 2, wherein the first length direction and the second length direction are perpendicular to each other.

4. The electronic device of claim 1, wherein when viewed from above the first conductive strip, a portion of the first conductive strip overlaps a portion of the second conductive strip.

5. The electronic device of claim 1, wherein the first ground portion and the second ground portion are disposed at two opposite sides of the second opening and provide a ground area.

6. The electronic device of claim 5, wherein the first ground portion and the second ground portion are disposed on two opposite sides of the second opening to have the same spacing with respect to the first conductive strip, and wherein the first conductive strip is positioned coplanar with the first ground portion and the second ground portion.

7. The electronic device of claim 1, wherein the first conductive strip includes a first first strip portion positioned inside the second opening and a second first strip portion extending from an end of the first first strip portion to an inside of the first opening.

8. The electronic device of claim 7, wherein the second first strip portion includes a first extension having a first width and a second extension extending from the first extension to a central portion of the first opening and having a second width, and wherein the second width of the second extension is greater than the first width of the first extension.

9. The electronic device of claim 1, wherein the second conductive strip includes a first second strip portion extending in a direction perpendicular to a length direction of the first conductive strip.

* * * * *